US009558622B2

(12) United States Patent
Irwin, Jr. et al.

(10) Patent No.: US 9,558,622 B2
(45) Date of Patent: *Jan. 31, 2017

(54) LOGISTICS METHODS FOR PROCESSING LOTTERY AND CONTEST TICKETS WITH GENERIC HARDWARE

(71) Applicant: Scientific Games International, Inc., Newark, DE (US)

(72) Inventors: Kenneth Earl Irwin, Jr., Dawsonville, GA (US); Edward J. Stanek, Des Moines, IA (US); William J. Huntley, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,865

(22) Filed: Dec. 22, 2014

(65) Prior Publication Data

US 2015/0111630 A1 Apr. 23, 2015

Related U.S. Application Data

(63) Continuation of application No. 13/644,231, filed on Oct. 3, 2012, now Pat. No. 8,915,780.
(Continued)

(51) Int. Cl.
*A63F 9/24* (2006.01)
*G07F 17/32* (2006.01)
(Continued)

(52) U.S. Cl.
CPC ........... *G07F 17/3225* (2013.01); *G06Q 20/10* (2013.01); *G06Q 20/32* (2013.01);
(Continued)

(58) Field of Classification Search
CPC .................................................. G07F 17/3225
See application file for complete search history.

(56) References Cited

U.S. PATENT DOCUMENTS 4,344,135 A 8/1982 Crane et al.
4,752,965 A 6/1988 Dunkley
(Continued)

FOREIGN PATENT DOCUMENTS

CN 1 387 171 12/2002
WO WO 2005/036485 A1 4/2005
WO WO 2009/152185 A2 12/2009

OTHER PUBLICATIONS

Leelasantitham, "A System for Checking Code Numbers Between on a Credit Card and a Paper of Personal Information", 2009, IEEE, The International Conference on Computer Technology and Development, pp. 455-458.
(Continued)

*Primary Examiner* — Steve Rowland
(74) *Attorney, Agent, or Firm* — Dority & Manning, P.A.

(57) ABSTRACT

A lottery data transfer method for processing lottery ticket data piggybacks on a merchant's existing debit or credit card interchange system. A BIN is assigned to lottery tickets that is unique in the merchant's credit or debit card interchange, the BIN associated with a lottery data blob also provided on the lottery ticket. The lottery BIN and data blob are into the merchant's existing credit or debit card activation barcode protocol to initiate transfer of the lottery data to a central lottery site via the interchange. At a processor within the interchange, the unique lottery BIN is flagged to initiate special routing to and further processing of the lottery data blob at the lottery central site, wherein the lottery data blob is processed outside of the interchange's debit or credit card data transfer and processing procedures.

15 Claims, 18 Drawing Sheets

Related U.S. Application Data

(60) Provisional application No. 61/596,385, filed on Feb. 8, 2012.

(51) Int. Cl.

| | | |
|---|---|---|
| *G06Q 30/00* | (2012.01) | |
| *G06Q 20/10* | (2012.01) | |
| *G06Q 20/32* | (2012.01) | |
| *G06Q 20/34* | (2012.01) | |
| *G06Q 30/06* | (2012.01) | |
| *G06Q 50/34* | (2012.01) | |

(52) U.S. Cl.
CPC ............. *G06Q 20/34* (2013.01); *G06Q 30/00* (2013.01); *G06Q 30/06* (2013.01); *G06Q 50/34* (2013.01); *G07F 17/32* (2013.01); *G07F 17/329* (2013.01)

(56) References Cited

U.S. PATENT DOCUMENTS

| | | |
|---|---|---|
| 4,850,009 A | 7/1989 | Zook et al. |
| 5,138,140 A | 8/1992 | Siemiatkowski et al. |
| 5,150,420 A | 9/1992 | Haraguchi |
| 5,191,525 A | 3/1993 | LeBrun et al. |
| 5,321,751 A | 6/1994 | Ray et al. |
| 5,337,358 A | 8/1994 | Axelrod et al. |
| 5,455,406 A | 10/1995 | Terashima et al. |
| 5,631,984 A | 5/1997 | Graf et al. |
| 5,767,496 A | 6/1998 | Swartz et al. |
| 6,014,454 A | 1/2000 | Kunkler |
| 6,267,670 B1 | 7/2001 | Walker et al. |
| 6,687,346 B1 | 2/2004 | Swartz et al. |
| 6,853,984 B1 | 2/2005 | Wilkes |
| 6,877,032 B1 | 4/2005 | Philyaw |
| 7,143,942 B2 | 12/2006 | Yamanaka et al. |
| 7,811,172 B2 | 10/2010 | Asher et al. |
| 8,328,094 B2 | 12/2012 | Proud et al. |
| 8,452,689 B1 | 5/2013 | Medina, III |
| 2008/0267502 A1 | 10/2008 | Youngers et al. |
| 2008/0310721 A1 | 12/2008 | Yang et al. |
| 2009/0185241 A1 | 7/2009 | Nepomniachtchi |
| 2010/0181755 A1 | 7/2010 | Irwin, Jr. et al. |
| 2010/0222125 A1 | 9/2010 | Nyman et al. |
| 2011/0091092 A1 | 4/2011 | Nepomniachtchi et al. |
| 2012/0258781 A1 | 10/2012 | Walker et al. |
| 2012/0270629 A1 | 10/2012 | Chau |
| 2012/0292384 A1 | 11/2012 | Wang et al. |
| 2012/0323708 A1 | 12/2012 | Marinakis et al. |

OTHER PUBLICATIONS

"AisleBuyer Raises Another $7.5 Million to Make Checkout Lines a Pain of the Past", Jason Kincaid, Jun. 13, 2011, http://techcrunch.com.

"Comment18inShare107Card io's SDK Makes Entering Credit Card Information as Easy as Taking a Snapshot", Jason Kincaid, Jun. 23, 2011, http://techcrunch.com.

LOGISTICS METHODS FOR PROCESSING LOTTERY AND CONTEST TICKETS WITH GENERIC HARDWARE

PRIORITY CLAIM

The present application is a Continuation Application of U.S. application Ser. No. 13/644,231, filed Oct. 3, 2012, which claims priority to U.S. Provisional Application Ser. No. 61/596,385, filed Feb. 8, 2012.

FIELD OF THE DESCRIBED METHODS

The present subject matter relates to methods and systems for performing all logistical functionality (e.g., activation, sales, validation, etc.) of lottery and contest type tickets (e.g., instant lottery tickets, on-line lottery tickets, promotional materials, etc.) using existing infrastructures without the need for additional lottery or game specific hardware installed at a retailer's location. Additionally, the use of the aforementioned infrastructures also enables street vendors to readily: activate, sell, and validate lottery tickets, and to pay applicable prizes of lottery games. The proposed methodologies and systems enable the sale/processing of lottery and contest tickets, as well as interchange of other data (e.g., check clearing, authentication, etc.) between the retailer to a central processing hub without the added expense and inconvenience of installing custom hardware. Finally, a method is disclosed to use off-the-shelf hardware to optically scan debit or credit cards in a secure fashion.

BACKGROUND AND SUMMARY OF THE INVENTION

Lottery games have become a time-honored method of raising revenue for state and federal governments the world over. Traditional scratch-off and on-line games have evolved over decades, supplying increasing revenue year after year. However, after decades of growth, the sales curves associated with traditional games seem to be flattening out with the existing retailer base appearing to plateau. Consequently, both lotteries and their service providers are presently searching for new sales venues.

One of the most promising genera of new lottery retailers are "big box" retailers (e.g., Walmart, Target, etc.) and drug store retailers (e.g., Rite Aid, CVS, etc.). However, attempts by lotteries and their service providers to recruit these new retailers have not succeeded. The main reasons for the lack of success is that lottery products are too labor intensive and require special equipment. Additionally, aside from the added cost of the special equipment, its placement may require big box and drug store retailers to have a separate lottery sales/redemption location possibly requiring extra staff. Additionally, in some venues it is desirable to use street vendors to sell lottery tickets that have not been able to use conventional lottery equipment and systems to provide the needed security for specialized lottery products.

To date, there have been numerous attempts to resolve this barrier to sales in big box and drug stores with special in-lane hardware (e.g., Herndon et. al. US2009/0163263, etc.) as well as special monitor interfaces to existing Point Of Sale (POS) systems (e.g., Behm et. al. U.S. Pat. No. 6,899,621), however all of these systems have required the addition of special scanning or dispensing hardware that consequently incur significant costs.

Recently, the popularity of prepaid gift and debit cards (referred to generically herein as "gift debit cards") sold at big box and drug store retailers has resulted in the implementation of barcode reading activation systems tightly integrated with the stores' POS (Point Of Sale) systems. Indeed, the $20 billion projected sales of open loop gift debit cards for 201 have resulted in the vast majority of big box and drug stores integrating gift/debit card activation systems into their POS systems. This mass adoption of gift debit card activation systems allows for other products with barcodes and data conforming to the same specifications as the gift card items to be activated, tracked, or validated without the need to add any additional hardware at the retailer location. Additionally, since gift/debit card activation systems are already integrated into the stores' POS systems, there is no need to have a separate location or additional staff to handle any additional products piggybacking on the gift debit card activation system.

This preponderance of existing gift debit card activation systems at big box and drug store POS systems creates the perfect foundation for lottery and contest systems to utilize the existing card activation network to pass lottery/contest data between the retailer POS and a central site database. By complying with the format of the gift card activation system, blobs of lottery or contest data can be interchanged between the retailer's POS and a central hub allowing transactions (e.g., instant sales, instant validation, instant inventory, quick pick bets, Power Ball validations, etc.) to be conducted without any custom hardware.

Of course, the above data blob exchange utilizing the existing gift card system can be applied to transactions other than lotteries and contests. In such an embodiment, the non-gift-card transactional data would also be encapsulated into a gift card activation network interchange. For example, driver's license data can be encapsulated into a gift card activation barcode format enabling it to be scanned and compared against a central database for authentication beyond a visual inspection of the license.

The concept of no or little customized hardware at the POS location can be extended to a portable retailer or street vendor. In this embodiment, off-the-shelf smart telephones can be incorporated as barcode scanners and the retailer interface, with a portable printer providing the necessary receipts and tickets. Indeed, with portable retailers or street vendors, the gift card network can be used to activate traditional plastic open loop debit cards that can be loaded with lottery or contest prize winnings at the time a winning ticket is presented to the street vendor. With this embodiment, the street vendor or portable retailer is no longer required to carry sufficient cash to pay winners, thereby helping to protect the vendor from theft and violent crime. Additionally, the smart telephone camera can be used to process an image of a debit or credit card with built-in Optical Character Recognition (OCR) allowing the street vendor to perform sales without accepting cash.

Therefore, it is desirable to develop methodologies for performing lottery and other transactions at the retailer POS requiring no special hardware.

Described herein are a number of mechanisms illustrating the practical advantages of as well as the details of reliably utilizing existing interchanges to eliminate the logistical need for any custom hardware at a retailer POS. The disclosed mechanisms thereby offering substantial savings (in eliminating hardware costs and maintenance) while at the same time reducing the clutter on retailer's counters as well as simplifying the retailer interface.

DETAILED DESCRIPTION

Figure 1:
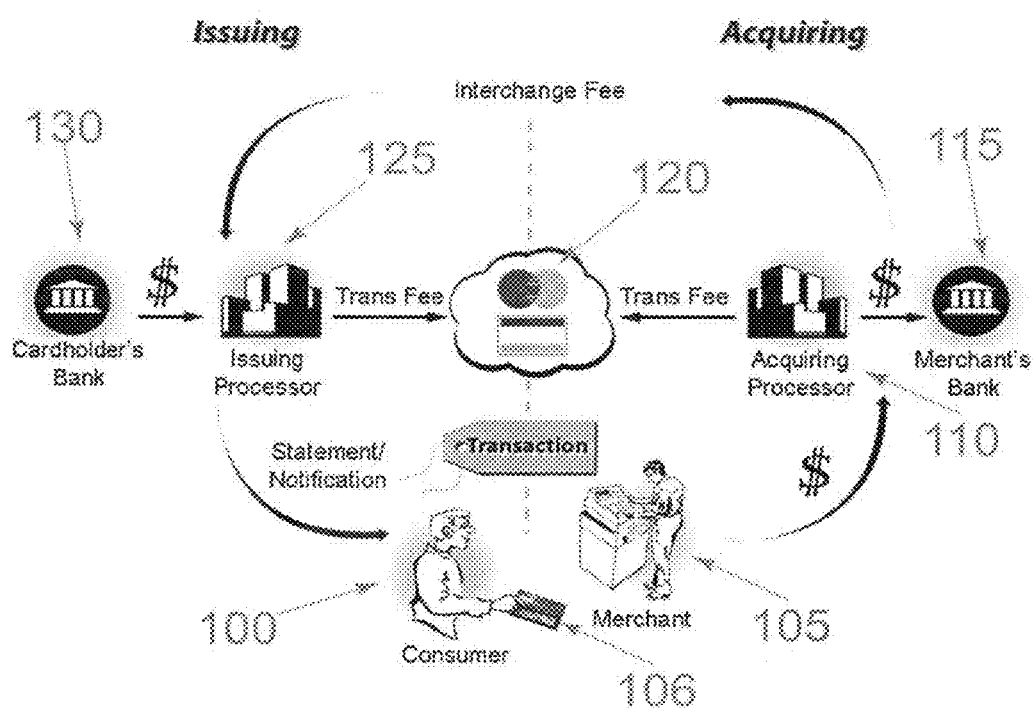
FIG. 1 is a flow chart of a representative example of the existing credit/debit card interchange network used for debit or credit card processing.

There are multiplicities of existing networks that can be utilized to exchange data without the logistical challenges of installing custom hardware. FIG. 1 depicts a representative example of the existing credit/debit interchange network that is presently utilized for purchases as well as open loop (i.e., can be used anywhere the interchange provider's card is accepted) gift/debit card activation. For a normal transaction, the consumer 100 makes a purchase (either in-person or on the Internet) and the merchant 105 accepts his debit or credit card data 106. The debit or credit card data 106 account number and other data, along with the cost of sale, is transmitted to the merchant's 105 acquiring processor 110—i.e., the institution that has contracted with the merchant to exclusively conduct his or her debit or credit card transactions. The acquiring processor 110 then forwards the transaction information to the interchange 120, garnering a fee for his or her troubles. The credit or debit card interchange 120 is actually comprised of multiple operators (e.g., Visa, MasterCard, Discover, etc.), which the acquiring processor directs the transaction to according to the first digit of the debit or credit account number 106. After the transaction data has been passed to the appropriate operator on the interchange 120 then, based on the Bank Identification Number (BIN) embedded in debit or credit account number 106, forwards the transaction information to the Issuing processor 125 of the card and garners a fee or levy of the transaction sale.

The issuing processor 125 of the debit or credit card account number 106 then queries the cardholder's bank 130 to determine if sufficient funds are available to cover the purchase. Assuming the funds are available, the issuing processor 125 then sends the approval notice back through the interchange 120 garnering a fee. This approval is then routed back through the acquiring processor 110 to the merchant 105 who delivers the goods. The actual funds are then electronically transferred from the cardholder's bank 130 to the merchant's bank 115 as a separate process with the consumer cardholder 100 ultimately receiving a statement that the transfer occurred.

This same interchange network of FIG. 1 is leveraged to enable gift/debit card activation at the time of sale. However, when typically activating a gift debit card its security package 150 (FIG. 2) UPC (Universal Product Code) 151 and proxy activation 152 barcodes are scanned to initiate the activation process.

In some merchant system's the scanning of the UPC barcode 151 assigned to a gift card package 150 (FIG. 2) informs the system that the next barcode scanned will be a proxy activation barcode 152 in a format compatible with the debit or credit card interchange. Therefore, in this embodiment, the merchant system automatically scans the subsequent proxy activation barcode 152 and sends the resulting scanned data through the interchange for gift debit card activation. Alternatively, other merchant systems do not employ this previously discussed UPC/proxy barcode state machine embodiment. Rather, in this new embodiment, the merchant system identifies unique characteristics of the gift-debit-card proxy barcode 152 and automatically routes the subsequent data through the debit credit card interchange regardless of the nature of the barcode previously scanned. With either gift-debit-card activation embodiment, once the POS equipment has scanned the gift debit card proxy barcode 152 the collected data is routed through the interchange.

Figure 2:
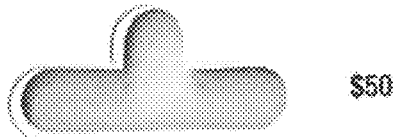
FIG. 2 is a back plan view of a first representative example of an open loop gift card package.
Figure 2:
Figure 2:
Figure 3:
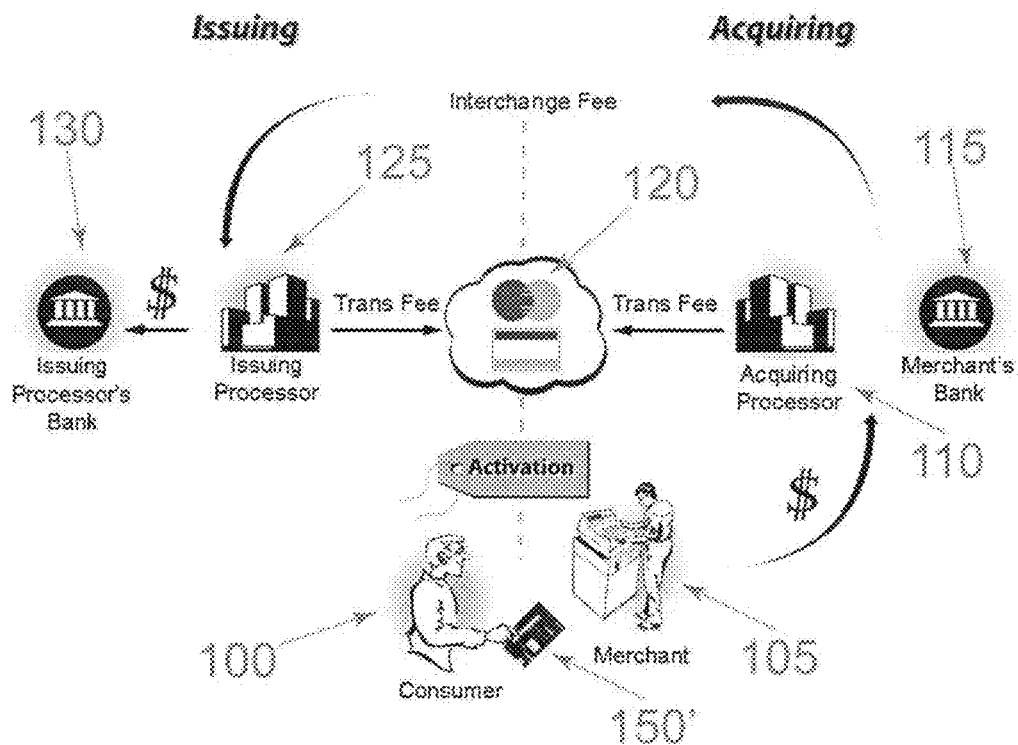
FIG. 3 is a flow chart of the representative example of the existing credit/debit card interchange network of FIG. 1 when it is utilized for open loop gift card activation.

As illustrated in FIG. 3, in any gift debit card activation process the consumer 100 takes the gift debit card package 150' to the merchant 105 who first scans the package 105 (FIG. 2) UPC barcode 151 and then the proxy activation barcode 152. As previously discussed, the existing merchant POS equipment automatically routs the scanned data from the subsequent proxy activation barcode 152 through the acquiring processor 110 (FIG. 3) and through the interchange 120 to the issuing processor 125. The issuing processor 125 receives the specially formatted gift-debit-card activation request, checks to determine if the number is authentic, and assuming it is authentic ensures that the issuing bank 130 reserves sufficient funds in the gift debit card account to cover the gift card value. (Typically, the FIG. 3 gift-debit-card selling merchant's 105 bank account 115 is swept for the funds to finance purchases within twenty-four hours after the sale of the gift debit card.) At this point, the issuing processor returns an acknowledgement to the merchant POS 105 via the interchange 120 and acquiring processor 110 that commands the merchant POS 105 to print an activation receipt for the consumer 100. As before, the acquiring processor 110 and interchange 120 garner fees for passing the data.

Figure 4:
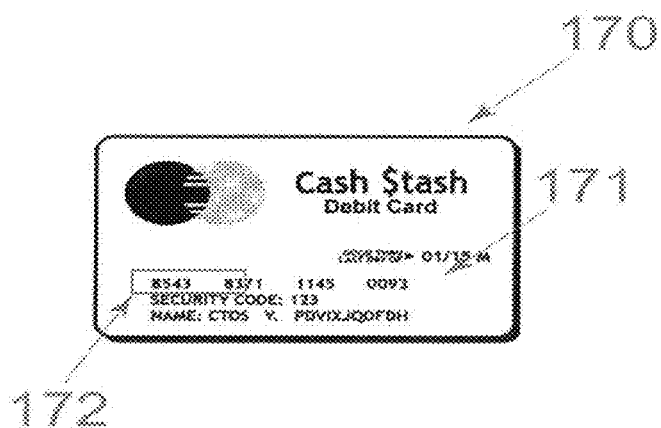
FIG. 4 is a front plan view of a first representative example of a debit or credit card account number taxonomy.

In all of the above debit or credit card transaction or gift card activation transactions, the data is transferred from the acquiring processor 110 (FIG. 1 and FIG. 3) through the interchange 120 to the issuing processor 125 by the numbering scheme of the debit or credit card 170 account number 171 as illustrated in FIG. 4. As shown in FIG. 4, the first four to six digits 172 constitute the Bank Identification Number (BIN) identifying the institutions (i.e., issuing processor and interchange operator) issuing/routing the card and associated data. Although it is called a Bank Identification Number, BINs can be used by other institutions, such as American Express or Western Union. Regardless of the institution, the BIN is always used by the acquiring processor 110 (FIG. 1 and FIG. 3), the interchange 120, and the issuing processor 125 to correctly route the transaction request. Multiple BINs can be assigned to the same issuing processor 125, allowing for the issuing processor 125 to support different functionality—e.g., different banking institutions 130, gift debit card activation, etc. Of course, the same BIN numbering scheme is also employed on gift debit card proxy numbers 152 (FIG. 2).

Thus, for a normal debit or credit card transaction or gift card activation, there is a minimum of four to seven entities involved each garnering fees. As will now be shown, this same interchange network can be used to integrate seamlessly into a lottery or contest system without the need of additional specialized hardware and its associated logistical costs. The main component being assigning a unique BIN to a lottery or contest system.

Figure 5:
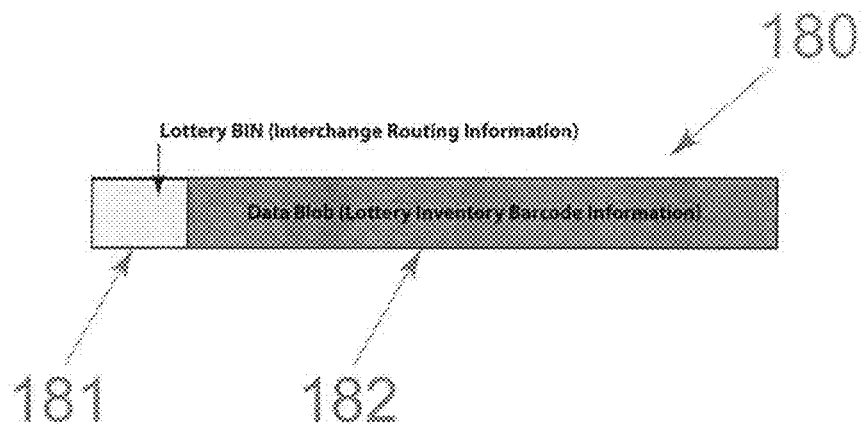
FIG. 5 is a block diagram of a first representative example of a data packet with a lottery BIN (Bank Identification Number) and associated instant ticket inventory data blob compatible with the interchange network of FIG. 6.

In one embodiment, assigning and printing a unique lottery BIN in the barcode on instant lottery tickets supplies all of the information necessary to route the instant ticket inventory control data through the debit or credit interchange. This data routing will automatically occur because the debit or credit interchange only uses the BIN to direct data through the interchange, with the remaining data in a debit or credit card number not processed by the interchange itself. (Strictly speaking, the above statement is not entirely correct; there can be a check digit embedded in the remainder of the debit or credit card data that ensures the integrity of the data being transmitted, however tis same check digit format can be calculated and embedded in other non-credit/debit card data.) Any data transmitted with the BIN is simply carried as a 'data blob' 182 (FIG. 5) that only has significance to the issuing processor 125 (FIG. 1 and FIG. 3). By assigning a unique lottery BIN 181 (FIG. 5) and concatenating instant ticket inventory control data as the associated data blob (182) the resulting data packet 180 will seamlessly pass through the interchange in a manner similar to a debit or credit card transaction. When the issuing processor 125 (FIG. 1 and FIG. 3) receives the concatenated packet 180 (FIG. 5), the issuing processor servers would know from the special lottery BIN 181 that the enclosed data blob 182 contained lottery information and to subject the packet to special processing either at the issuing processor 125 (FIG. 1 and FIG. 3) or another location.

Of course, as is obvious to anyone skilled in the art, this same technique of leveraging the interchange network and assigning unique BINs can be used for other types of data transfer (e.g., consumer authentication, check cashing, etc.) requiring information to be exchanged between the merchant's POS system and a central data processing hub.

Figure 6:
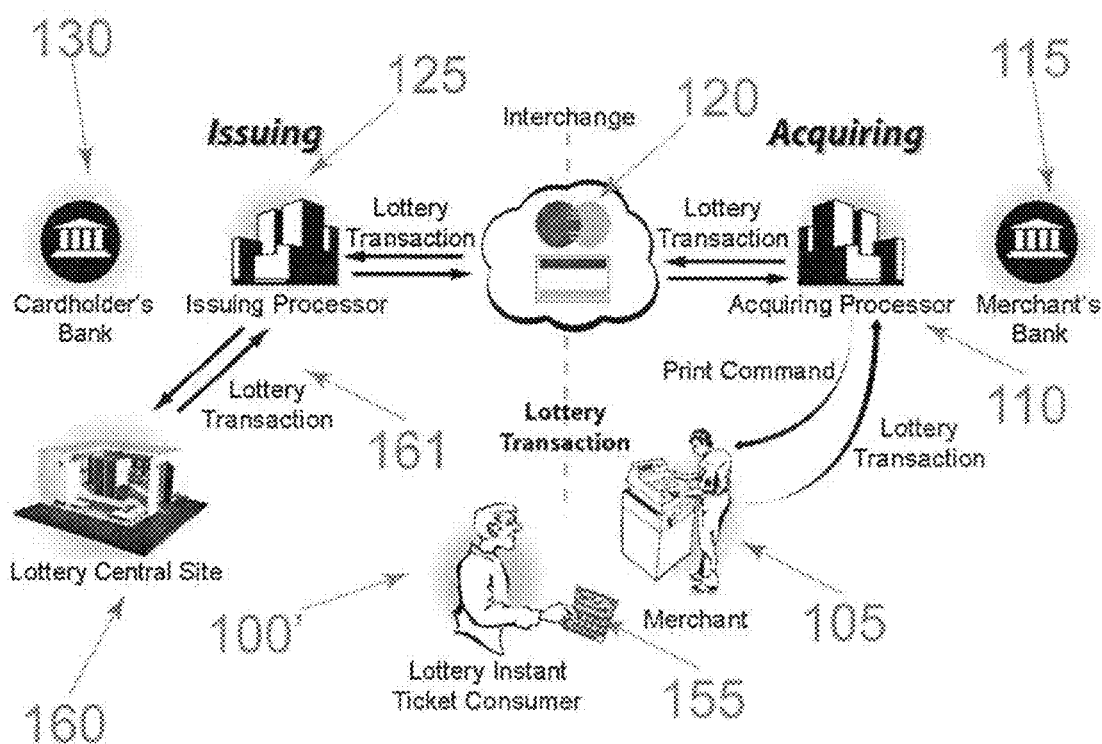
FIG. 6 is a flow chart of the representative example of the existing credit/debit card interchange network of FIG. 1 when it is utilized for instant (scratch-off) lottery ticket sales.

Applying the interchange network of FIG. 1 and FIG. 3 to enable instant (scratch-off) lottery ticket sales then is a matter of configuring the instant ticket barcode to a format resembling a proxy number barcode 180 (FIG. 5) and adding an interface from the issuing processor 125 to a lottery's central site server 160 (FIG. 6). In this system the instant lottery ticket consumer 100' would purchase an instant lottery ticket 155 from a merchant 105. The merchant 105 scans the instant lottery ticket's 155 UPC and/or proxy number compatible barcodes to automatically trigger the merchant's POS equipment 105 to route the lottery ticket's 155 proxy number compatible barcode data 180 (FIG. 5) to the acquiring processor 110 (FIG. 6), through the interchange 120, to the specified issuing processor 125, and then ultimately to the lottery's central site 160.

In this embodiment, processing the sale of instant lottery tickets 155 is accomplished by the lottery prearranging to have a special data interface 161 between the lottery's central site 160 and the issuing processor's 125 servers. The exact nature of this interface 161 can vary so long as sufficient techniques are employed for the link to remain secure to data manipulation or monitoring. However, in the preferred embodiment a Virtual Private Network (VPN) would be employed to ensure that the interface 161 was authenticated and encrypted, with its unique Internet Protocol (IP) addresses secured from monitoring. Regardless of the low level details of the interface 161, the data exchanged for an instant lottery ticket sale (i.e., embedded in the data blob 182 (FIG. 5)) would be the instant ticket proxy barcode data and an identifying code of the retailer making the sale.

Figure 7:
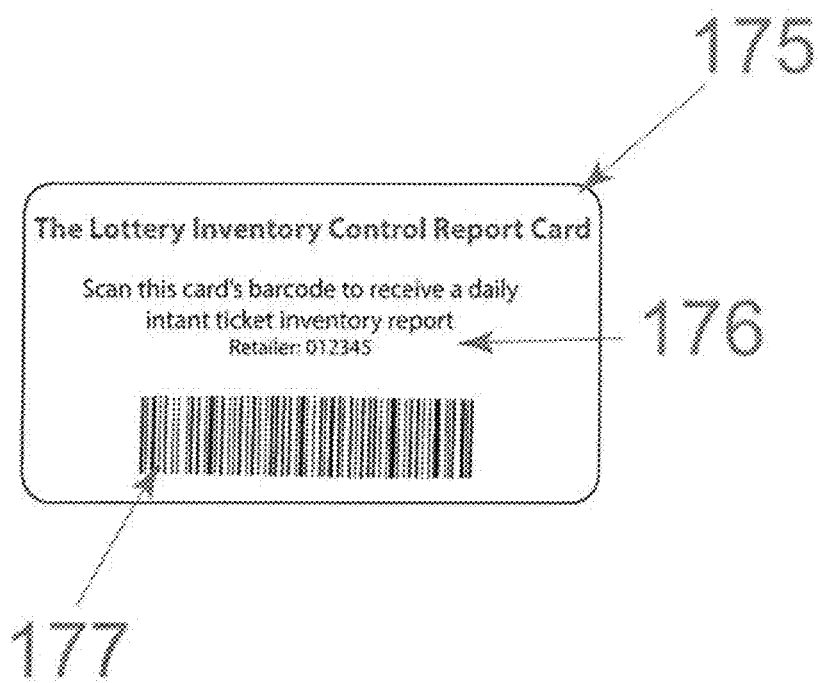
FIG. 7 is a front plan view of a first representative example of an instant ticket inventory reporting card compatible with the interchange network of FIG. 6.
Figure 8:
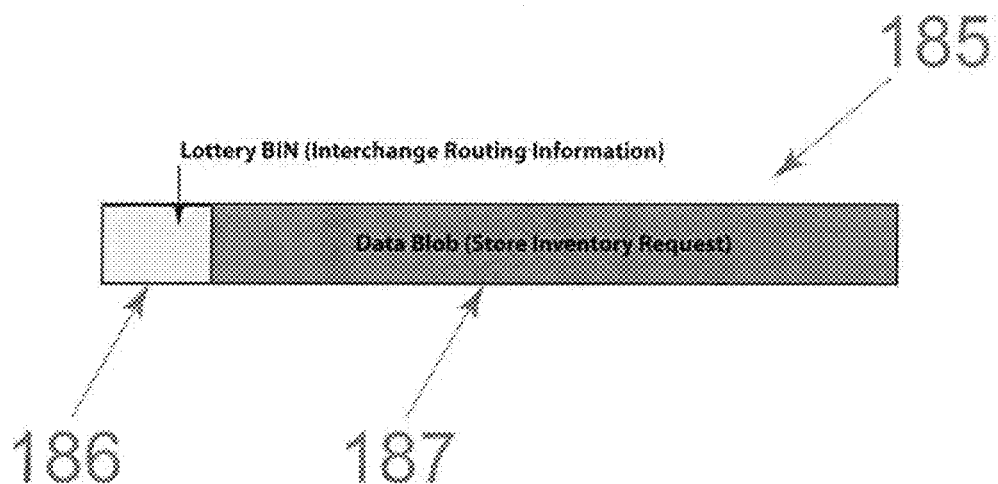
FIG. 8 is a block diagram of a first representative example of a data packet with a lottery BIN and associated instant ticket inventory request blob compatible with the interchange network of FIG. 6.

Returning to FIG. 6, once the issuing processor has forwarded the instant lottery ticket sale information and the retailer identification code to the lottery's central site 160, the lottery's servers will log the sale, thereby maintaining a record on the lottery's database. If desired, the same lottery central site 160 can transmit a print receipt command back through the interchange network 120 and the acquiring processor 110 to the merchant's POS 105 printer thereby completing the sale. Since piggybacking on the debit or credit interchange logs every instant ticket sale; inventory control and the problem of maintaining a centralized inventory control for instant ticket sales can be resolved by supplying the merchant with a special barcoded inventory control report card 175 (FIG. 7). By scanning the proxy compatible barcode 177 on the inventory control report card 175 the merchant would be able to use the debit and credit interchange to send a request for an instant ticket inventory report through the acquiring processor 110 (FIG. 6), interchange 120, and issuing processor 125 to the lottery's central site 160. When the request is received at the lottery's central site 160, its servers will generate the requested inventory report and send a series of print commands back through the same interchange path to cause the merchant's POS printer to print a hardcopy of the report at the merchant's location 105. Of course, for this system to work, each merchant would have to be assigned an unique inventory report card 175 (FIG. 7) with the merchant's identity encoded on the card both as human readable 176 as well as embedded in the proxy barcode 177. As before the inventory request proxy barcode 177 would be configured with the lottery BIN 186 (FIG. 8) concatenated to the merchant's instant ticket inventory request as the associated data blob (187) with the resulting packet 185 passed through the interchange in a manner similar to a gift card activation transaction. However, in this embodiment the store inventory request would be a flag to alert the lottery central site 160 (FIG. 6) that the transaction is an inventory request and possibly identifying data unique to the merchant issuing the request.

Alternatively, the merchant could be provided with a special application on a computer or mobile device that query the lottery central site 160 via communications channels (e.g., the Internet) alternative to the interchange. The significant point being that inventory reporting and control are enabled by the lottery's central site 160 logging every instant ticket sale.

Inventory control of instant lottery tickets has been a particularly vexing problem in the past, with the primary solution to date being to install one form or another of vending devices at the merchant's establishment, thereby keeping the instant ticket inventory under lock and key with an automated device tabulating how many tickets were sold. The disadvantages of this approach being the high cost of vending hardware as well as the logistical problems associated with installing and maintaining the vending hardware, in addition to the physical space the vending hardware consumes. Alternatively, a barcode reader interfaced to a lottery terminal already installed at the retailer has also been attempted for instant ticket inventory control. However, this alternative had the disadvantages of requiring the retailer to interface with two devices (i.e., POS equipment and the lottery terminal) as well as the extra cost associated with requiring custom hardware to be installed at the retailer's place of business.

Aside from eliminating the need for special vending hardware, utilizing the debit or credit interchange allows the merchant 105 (FIG. 6) to audit his or her instant ticket inventory at any time, significantly reducing the motivation for theft since missing instant ticket inventory could be detected more easily. Moreover, the utilizing of the merchant's POS 105 register to log each ticket sold enables each instant ticket to be activated on an individual basis. The term 'activation' in this context meaning that the lottery central site only allows activated tickets to be validated resulting in payment of prizes.

The last point is significant. Traditionally instant tickets are typically shipped in packs of twenty to one hundred with the pack itself being the unit of activation. This gross quantization of activation has caused numerous problems throughout the history of the lottery industry. For example, individual instant tickets stolen from an activated pack can be validated on a lottery system so long as the pack is not reported stolen. Conversely, when a partial pack is reported stolen the problem of estimating, which tickets in the stolen pack were legitimately sold and which were stolen remains. Additionally, pack rather than ticket activation forces lotteries to rely on winning ticket validations to estimate sales to consumers—i.e., a crude metric at best with typically only 1 out of 5 tickets winning. Furthermore, the pack activation model can allow a significant amount of free retailer financial float, since the retailer can sometimes begin selling from a pack of instant tickets and not have to reconcile until 90 days after activation.

All of these pack activation problems are solved with the lottery central site 160 (FIG. 6) being cognizant of every instant ticket sale. However, with specially installed hardware at the merchant's establishment logging each ticket sale for activation has proven not to be been practical or economical. One of the main reasons being that custom lottery hardware is by necessity placed in a different location than the merchant's cash register, making it inconvenient for the merchant to execute the sale in one location and scan the instant ticket's inventory control barcode in a different location. While it is possible (at some expense) to install a separate barcode scanner near the merchant's cash register with an interface to the lottery terminal, the clerk would still be obliged to perform two operations with two different user interfaces—i.e., problematic at best. Even if a custom hardware device is installed on the merchant's cash register to monitor scanned UPC barcode data for lottery assigned UPC data (e.g., Behm et. al. U.S. Pat. No. 6,899,621) the instant ticket inventory/activation problem persists, because the UPC data does not contain ticket inventory control information needed for ticket level activation. In other words, all instant lottery tickets of the same game would share the same UPC data, making it extremely difficult to distinguish which ticket serial numbers were sold. However, by piggybacking on the debit or credit interchange with lottery instant ticket sales, the logging/activation mechanism leverages the same user interface that the merchant uses everyday as well as the same physical procedure used for gift debit card activation.

The same piggyback via BIN mechanism that enables instant ticket sales can also be utilized for validation of winning instant tickets. In this context, the term validation means authenticating a perceived winning ticket by interfacing with the lottery central site. Not surprisingly, the piggybacking on the interchange configuration for instant ticket validation is essentially the same as instant ticket sales (FIG. 6).

Figure 9:
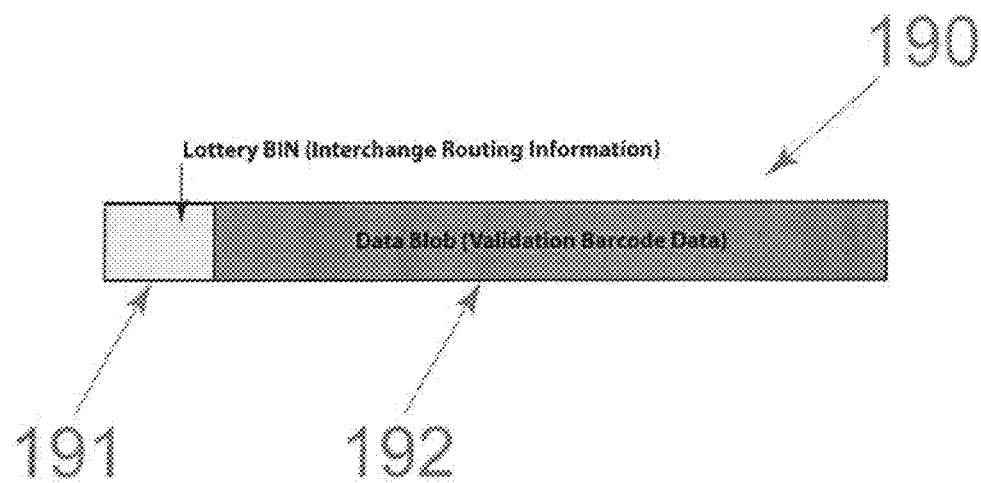
FIG. 9 is a block diagram of a first representative example of a data packet with a lottery BIN and associated instant ticket validation request blob compatible with the interchange network of FIG. 6.

In the preferred embodiment, processing an instant ticket validation begins with the lottery instant ticket consumer 100' presenting a perceived winning instant ticket 155 to the merchant 105 for prize payment. The merchant scans the barcode that was hidden under the unplayed ticket's Scratch-Off-Coating (SOC). As previously discussed, the merchant may have to first scan the instant ticket's UPC barcode to place his or her POS equipment into a special state to process the proxy barcode. This barcode configured to be compatible with the proxy data normally passed over the debit or credit interchange 120 with the lottery BIN 191 (FIG. 9) concatenated to a data blob (192) containing the ticket's validation data forming the whole proxy data 190. In this context, the term 'validation data' refers to data not available until after the instant ticket is played (i.e., SOC removed) that is used by the lottery central site 160 (FIG. 6) to determine if the ticket is a winner or not.

Figure 10:
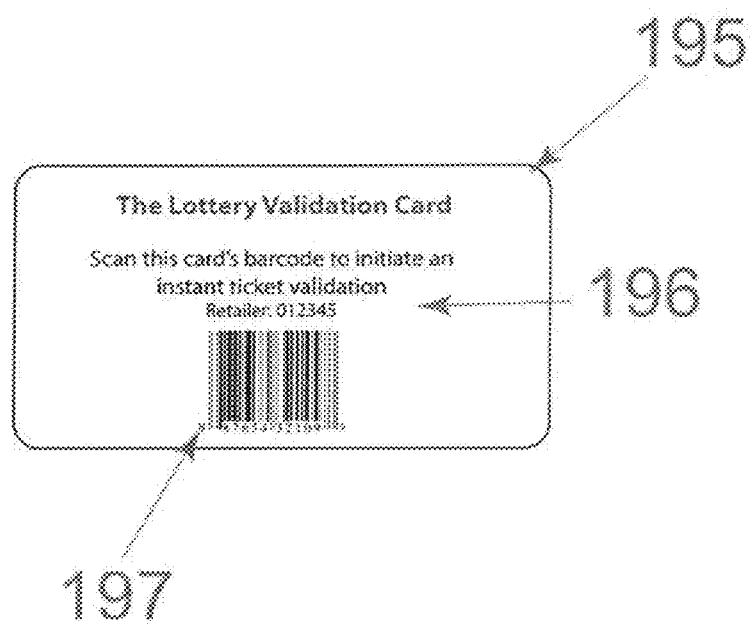
FIG. 10 is a front plan view of a first representative example of an instant ticket validation initiation card compatible with the interchange network of FIG. 6.

In another embodiment, the lottery instant ticket consumer 100' presents a perceived winning instant ticket 155 to the merchant 105 for prize payment. However, in this embodiment, the validation barcode previously under the SOC is unreadable or for other reasons unavailable. Thus, in this embodiment the merchant scans the barcode 197 (FIG. 10) on a special validation card 195 that places the merchant's POS equipment in a special state to validate instant tickets. Since the special validation card 195 initiates the validation process, a UPC format may be required on the card's 195 barcode 197 to be compatible with some POS equipment. In this case, special UPC data would be reserved for instant ticket validation purposes that would not automatically count as a sale on the POS equipment's database. After the validation card's 195 barcode 197 is scanned and the merchant's POS equipment is in a state to process instant ticket validations, the merchant would scan the instant ticket inventory control barcode that was used to register the sale on the lottery's central site. At this stage, the validation transaction can proceed. For extra security, the merchant's POS equipment may prompt the merchant to key in numerical data that would be hidden under the SOC of an unsold ticket but exposed after the SOC is removed.

Returning to FIG. 6, with either embodiment once the validation process was initiated by the merchant 105, the validation data (either validation barcode data, inventory barcode data, or inventory barcode plus added data) will be transmitted through the acquiring merchant 110 and the interchange 120 to the issuing processor 125. At this point the issuing processor 125 would have detected the lottery BIN in the transaction and forwarded the validation to the lottery central site 160 via the dedicated communications channel 161.

The lottery central site 160 will then: extract the validation data from the transaction's data blob 192 (FIG. 9), determine from flags within the data blob 192 that the associated data is an instant ticket validation and processes the validation. Alternatively, an unique 'lottery validation BIN' could be employed to still direct the transaction to the lottery central site 160 (FIG. 5), but eliminate the need to embed a flag in the data blob 192 (FIG. 9) informing the lottery central site 160 (FIG. 6) that the associated data is a lottery validation transaction. In both cases, the lottery central site 160 will determining if in fact the validation request is associated with a winning ticket and route the appropriate response back through the same interchange path to the merchant 105, causing either an authorization to pay or a message not to pay a prize to be printed on the merchant's printer 105.

Figure 11:
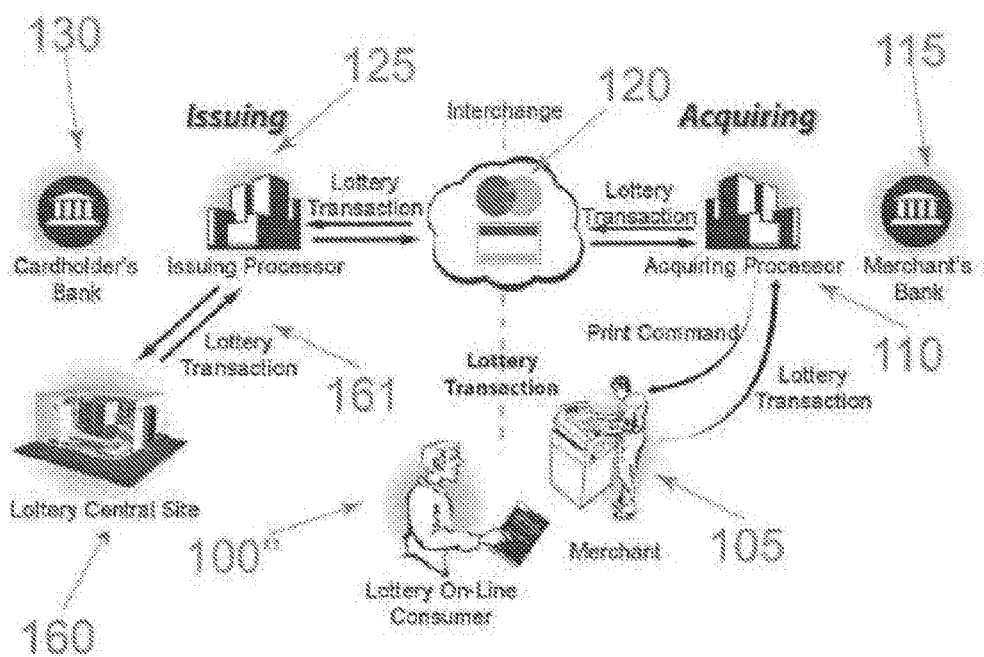
FIG. 11 is a flow chart of the representative example of the existing credit/debit card interchange network of FIG. 1 when it is utilized for on-line lottery ticket sales.

Aside from instant ticket processing, the same piggybacking via BIN mechanism over the interchange that enables instant ticket sales can also be utilized for on-line (e.g., Pick 3, Pick 4, Powerball, Mega Millions, etc.) sales and validation. As illustrated in FIG. 11, the debit or credit card interchange usage for on-line lottery transactions is virtually identical to instant ticket transactions (FIG. 6) with the only difference being the actions of the consumer 100" (FIG. 11) and the merchant 105.

For quick-pick (i.e., numbers automatically selected for the consumer) purchases of on-line tickets, the consumer would either take a plastic hanging card 200 (FIG. 12) with a quick-pick coded interchange compatible barcode 201 to the merchant or simply ask the merchant for a quick-pick for a given on-line game (e.g., Pick 3, Pick 4, Powerball, Mega Millions, etc.) The merchant would either take the hanging card or pull one from behind the counter (or from a pocket in the case of a street vendor) and scan the UPC barcode for the quick-pick sale (202) followed by the interchange compatible barcode 201 to trigger a quick-pick request. In either case, the interchange compatible barcode 201 will be configured to be compatible with the proxy data normally passed over the debit or credit interchange 120 with the lottery BIN 206 (FIG. 13) concatenated to a data blob (207) containing the quick-pick request data forming the whole proxy data 205.

As before, the pending quick-pick transaction is forwarded to the acquiring processor 110 (FIG. 11), routed through the interchange 120, to the issuing processor 125. The issuing processor would then detect either a lottery BIN or a special 'lottery quick-pick BIN' and route the pending transaction through the designated channel 161 to the lottery's central site 160 or complementary gaming system. The lottery's central site or complementary gaming system would then decode the quick-pick request, use a random number generator to generate a pseudorandom quick-pick, log the quick-pick transaction with a generated serial number on its database, and transmit a print command documenting the quick-pick and the assigned serial number to be printed on the merchant's printer at his or her location 105 and recorded at the central site at a later time if a complementary gaming system is used.

It should be noted, that until recently the printing of quick-pick ticket printing process would not have been possible via the piggyback interchange BIN mechanism. This is because on-line tickets are traditionally printed on ticket stock with serial numbering preprinted on the back along with other security features (e.g., ultraviolet visible ink). The preprinted serial numbering and other features providing added security in determining the authenticity of an apparent high-tier winning ticket. Therefore, the need for special preprinted security paper would prohibit a merchant from printing quick-pick tickets using his or her normal cash register or other printer—i.e., the logistical challenges would prohibit merchants from loading special lottery paper into their cash register. Alternatively, the merchant could be supplied with a special lottery printer that uses the special security paper, but the addition of a lottery printer would necessitate custom lottery interfaces for the merchant's POS equipment, increasing the costs and re-introducing custom lottery hardware at the POS.

Fortunately, recently two Ticket Message Authentication Code (T-Mac) patents have issued (i.e., Irwin U.S. Pat. No. 7,788,482 and U.S. Pat. No. 8,037,307) which eliminates the need for special security paper for on-line tickets by employing cryptographic techniques that add a Message Authentication Code (Mac) to the ticket's serial number that make it virtually impossible to copy or forge the ticket. However, the T-Mac patents reference certain cryptographic functions being performed by field lottery terminals. In the context of the piggyback interchange BIN mechanism, the lottery terminal would be the merchant's POS equipment 105 (FIG. 11). In a preferred embodiment, the T-Mac applicable software is loaded into the merchant's POS equipment. This embodiment has the advantage of a wide terminal distribution and no additional hardware at the retailer's location.

However, while loading the necessary cryptographic software onto the merchant's POS equipment 105 is certainly feasible, it does offer certain logistical challenges associated with loading specific purpose software on POS equipment. Another embodiment would be to add lottery specific hardware to process T-Macs to each POS register, however this embodiment has the disadvantage of the added hardware costs as well as the logistical challenges (e.g., installation, POS driver software, etc.) associated with connecting specific hardware to retailer's POS equipment. In yet another embodiment, the lottery T-Mac subsystem could leverage. In yet another embodiment, the lottery T-Mac subsystem could leverage the multiple parties inherent in the piggyback interchange BIN system, to supply the required remote cryptography functionality via another entity than the lottery central site. While not as inherently robust, this embodiment would have the advantage of not needing any software modifications to the merchant's POS equipment, thereby eliminating the associated logistical challenges. While in theory, any party could implement a T-Mac system, in a preferred embodiment the issuing processor 125 would provide a separate server that would assign separate cryptographic keys to each participating merchant 105. Thus, when a quick-pick transaction was conducted, the issuing processor's 125 T-Mac server would intercept all quick-pick print commands sent from the lottery central site 160 that were transmitted through the lottery transaction channel 161. The issuing processor 125 T-Mac server would then create the appropriate Message Authentication Code (Mac) for the associated quick-pick serial number, appending it to the print command sent to the merchant 105 thereby completing the sale. Thus, in this embodiment, the T-Mac security which is partially derived from separation of cryptographic keys from the lottery central site 160 is maintained by locating a T-Mac server at the issuing processor 125. Of course, as is obvious to anyone skilled in the art, other cryptographic embodiments are possible and may be preferable depending on the lottery's business relationships with the various entities on or off the interchange.

Figure 14:
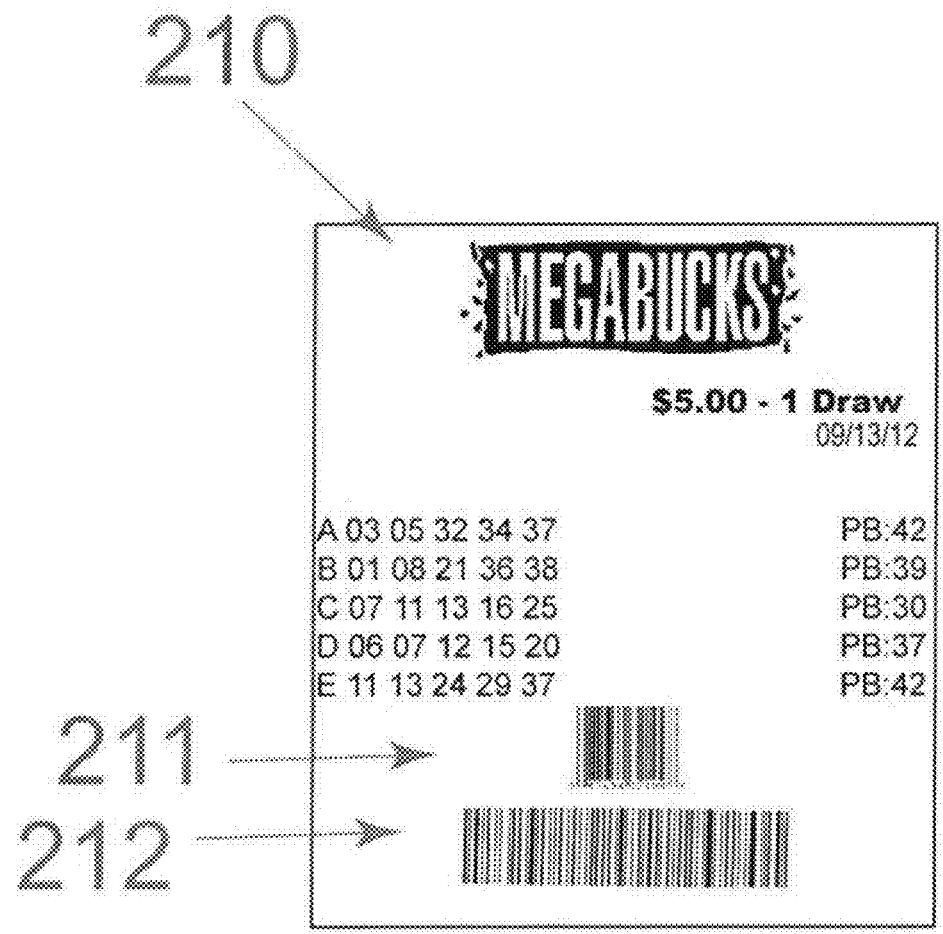
FIG. 14 is a front plan view of a first representative example of an on-line game ticket compatible with the interchange network of FIG. 11.

Validations of on-line game tickets (e.g., Pick 3, Pick 4, Powerball, Mega Millions, etc.) are conducted similar to instant ticket validation. In the preferred embodiment, processing an on-line game ticket validation begins with the lottery on-line ticket consumer 100' presenting a perceived winning on-line ticket 210 (FIG. 14) to the merchant 105 (FIG. 11) for prize payment. Assuming the POS equipment requires an UPC barcode scan, the merchant first scans the on-line ticket's 210 (FIG. 14) UPC formatted barcode 211 to place the POS equipment in a state to receive gift debit card activation data. It should be noted; special UPC data would be reserved for on-line ticket validation purposes that would not automatically count as a sale on the POS equipment's database. Immediately after, the merchant scans the on-line ticket's 210 UPC formatted barcode 211 and then the second interchange compatible barcode 212. Alternatively, the merchant's POS equipment could be configured to recognize interchange compatible barcode formats 212 without being placed in a special state. If this is the case, the on-line ticket may omit the UPC formatted barcode 211.

Figure 15:
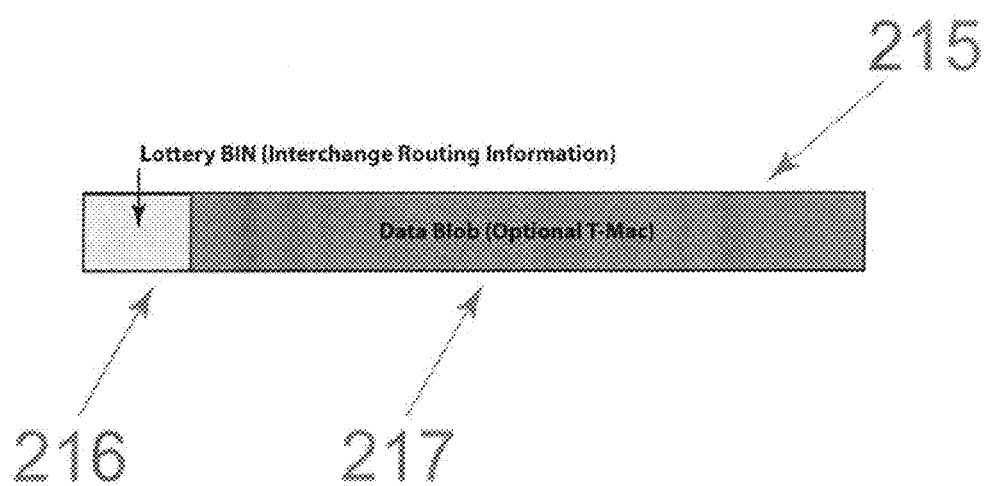
FIG. 15 is a block diagram of a first representative example of a data packet with a lottery BIN and associated on-line ticket validation request blob compatible with the interchange network of FIG. 11.

In either case, the interchange compatible barcode 212 will be configured to be compatible with the proxy data packet 215 (FIG. 15) normally passed over the debit or credit interchange with the lottery BIN 216 concatenated to a data blob (217) containing the on-line ticket validation request. Optionally, the proxy data packet 215 could also contain a T-Mac in addition to the standard lottery on-line ticket serial number.

Returning to the pending on-line ticket validation, the merchant's POS equipment 105 (FIG. 11) would then forward the interchange compatible packet 205 (FIG. 13) (including the embedded on-line ticket data blob 207) to the acquiring processor 110 (FIG. 11), that would then use the BIN header 206 (FIG. 13) information to route the packet through the interchange 120 (FIG. 11) to the acquiring processor 125. The acquiring processor's 125 servers would then detect the lottery BIN and forward the received data packet through the interchange 120 to the issuing processor 125 which would then forward the data packet through the lottery transaction channel 161 to the lottery central site 160. The lottery central site would then extract the on-line ticket validation request, comparing the received serial number to a drawing database to determine if the scanned ticket's serial number is a winner or not and if it was previously cashed. Optionally, if a T-Mac were present with the scanned ticket's serial number, the lottery central site 160 would also perform a cryptographic function on the T-Mac to determine if the resulting clear text is compatible with the ticket's serial number. The lottery central site would then send a print statement back through the interchange 120 to the merchant's POS equipment 105 where a winning/losing receipt would be printed.

Of course, the entire debit or credit interchange only exists because it garners fees per transaction. With piggybacking on the debit or credit interchange for lottery transactions, this paradigm need not change. When the high costs of manufacturing, installing, maintaining, and communicating with custom lottery field hardware is taken into account the economics of paying a small fee per lottery transaction with virtually no upfront costs becomes attractive. Essentially the lottery economic model changes from a system with significant upfront costs as well as continuing communications charges, to a leased services model that only pays per transaction with the benefit of virtually no upfront or continuing communications costs.

Indeed, when a lottery service provider wins a bid for providing, installing, and maintaining lottery equipment, the lottery service provider must pay for the equipment and network at the time of contract award. The lottery service provider hoping to regain the massive capital outlay as well as associated finance charges throughout the course of the contract—i.e., typically lottery contracts in the U.S. provide little or no payments at contract award. This is why publicly traded lottery service providers typically report lower quarterly earnings immediately after they win large new lottery contracts. In other words, the capital outlays required to finance a lottery contract startup effort tend to consume any available revenue in the same fiscal quarter.

Aside from virtually eliminating lottery startup costs, recent United States federal legislation (e.g., Durbin amendment) limiting what the debit or credit card interchange can charge per transaction have forced interchange providers to look for new sources of revenue. This is turn, makes piggybacking on the debit or credit interchange for lottery transactions more attractive to not only the lottery service providers but the interchange providers as well. Thereby creating a synergistic opportunity for all parties involved.

Of course, as is obvious to one skilled in the art, other established retail network systems (e.g., coupon validation) can be employed to provide the same sans custom hardware functionality as the debit or credit card interchange previously described and indeed, in some circumstances may be preferable.

In addition to brick and mortar merchant locations, the notion of sans custom hardware lottery or contest operations can be expanded to street vendors. While unusual in the United States, street vendors are a common sight in developing countries creating sales without the need for an established lottery infrastructure using brick and mortar locations. Traditionally, these street vendors would roam with a limited inventory of instant tickets literally conducting street sales and paying small prizes on the spot. The typical lack of connectivity to a lottery central site forces the street vendor to reconcile at the end of the day, matching unsold inventory and claimed tickets with the amount of cash reserves at the end of the day. This lack of connectivity and the need to carry potentially large amounts of cash have created security problems for the street vendor.

However, smart phone technology has recently become sophisticated enough to permit programming cell phones (to do computations, perform functions, and store data) previously reserved for laptop or desktop computers. The latest generation of these smart phones is equipped with higher resolution cameras that can function to record information that can also be transmitted over a cellular network.

Technology has also evolved in the automobile rental industry that permits hand held thermal printers with barcode scanners and keyboards to communicate with servers over short distances to exchange information, complete transactions and print receipts for customers remote from traditional clerks stationed at immobile terminals.

Given these advancements and their equipment miniaturization, there are now alternatives that can allow lottery transactions that have been restricted to stationary locations to become fully portable and adaptable for street vendor use. The synergistic coupling of these newer generic hardware technologies with cellular networks and associated payment mechanisms allows for street vendor based lottery systems to operate without the need and associated expense of custom hardware. Additionally, by using debit cards both for procurement and prize payments with off-the-shelf equipment and networks reduces both the potential for street vendor fraud as well as reduces the risks associated with robbery since the vendors will no longer need to carry large amounts of cash on their persons.

Figure 16:
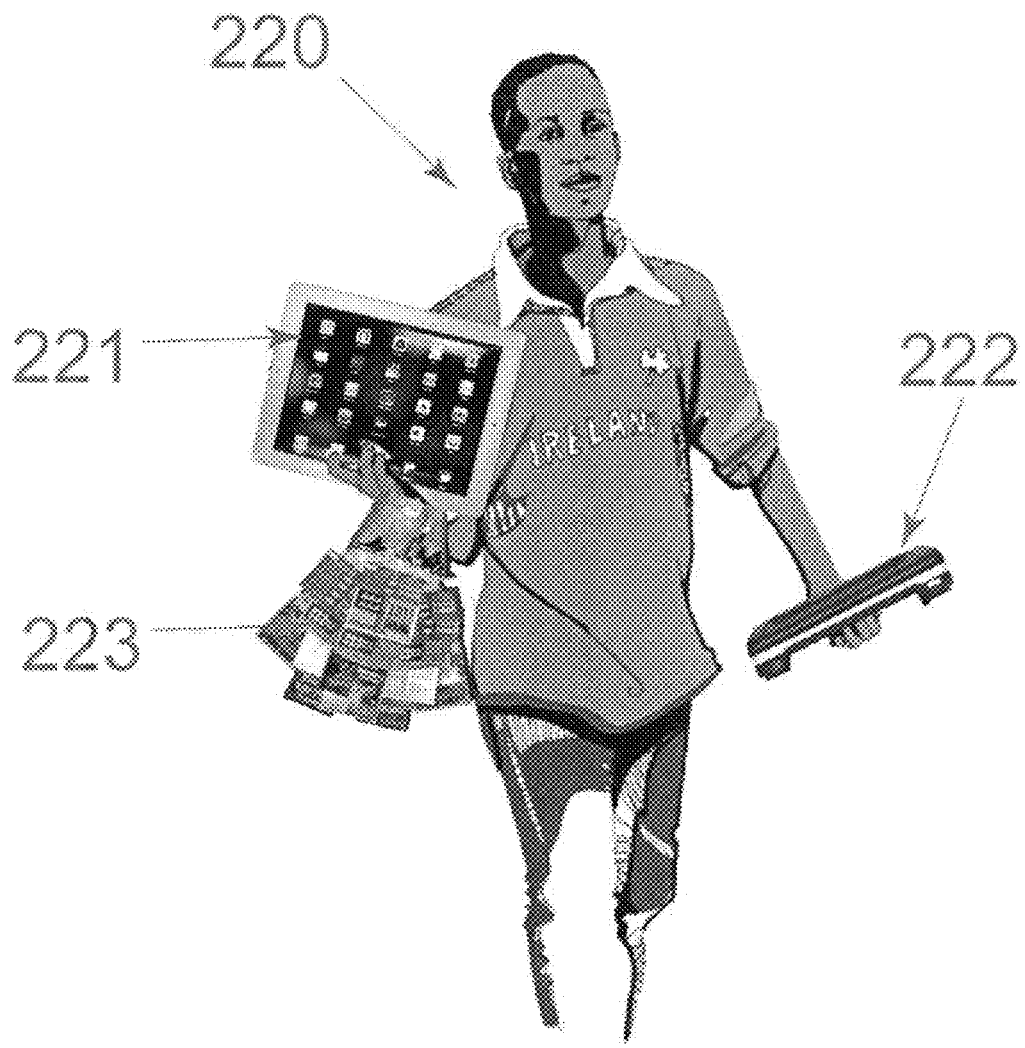
FIG. 16 is a front plan view of a first representative example of a lottery street vendor with off-the-shelf hardware.

In one embodiment, the street vendor 220 (FIG. 16) is equipped with a tablet computer/communications device (e.g., Apple iPad) 221 as well as a portable battery powered printer (e.g., HP Officejet H470) 222, instant lottery tickets 223, and debit cards with no cash value loaded (not shown in FIG. 16). Thus in this embodiment, no special lottery equipment is carried by the street vendor. However, it should be noted, that even though this embodiment utilizes off-the-shelf equipment and networks there is still the need for lottery customized software (in the form of an application) to be resident on the computing/communications device 221 (e.g., iPad). Additionally, there may be a requirement for accessories to accommodate connecting the off-the-shelf computing/communications device 221 to a mobile communications network standard or to other support hardware. For example, the portable battery powered printer 222 sited in the above text is a HP Officejet model H470, which would require a wireless dongle to interface with the sited tablet computer/communications device iPad 221 over an 801.11 (WiFi) wireless link along with loading a free HP ePrint app on the tablet computer/communications device 221.

In this embodiment, the street vendor 220 would be able to sell both instant and on-line (e.g., Pick 3, Pick 4, etc.) lottery tickets as well as validate and redeem both. Additionally, like the debit or credit card interchange piggyback embodiment with brick and mortar merchants, the street vendor 220 would also be able to activate instant lottery tickets 223 individually at the time of sale. The advantages being both automatic inventory accounting as well as reduced chances of theft since the un-activated instant tickets 223 would not validate or redeem on the lottery system.

An instant ticket sale would be conducted by the street vendor receiving payment for an instant ticket which he or she would log into their portable tablet computer/communications device 221 either by touchscreen numerical entry or, preferably, by scanning a debit card for payment. The touchscreen numerical entry being primarily envisioned for cash sales and therefore having the disadvantage of possibly burdening the street vendor 220 with large sums of cash with the inherent security risks. In a preferred embodiment, a debit (or possibly credit) card is accepted for payment—i.e., depending on the laws in the lottery's jurisdiction, it may not be legal to accept credit cards as a form of payment for the sale of lottery products. In this embodiment, the street vendor 220 would scan or swipe the debit or credit card also scanning the barcode of the instant ticket(s) being sold on the tablet computer/communications device 221. Swiping of the debit or credit card (i.e., acquiring the magnetic stripe or smart card data) could be accomplished with a third party off-the-shelf portable reader (not shown in FIG. 16), however this embodiment has the disadvantage of encumbering the street vendor 220 with another device to carry, as well as power source and interface. In a preferred embodiment, the street vendor 220 would instead use the built-in camera typically found on the portable tablet computer/communications device 221 to collect one or more images of the debit or credit card for Optical Character Recognition (OCR) processing of the embossed or printed card data.

With either embodiment, once the instant ticket and payment information has been collected by the street vendor's 220 portable tablet computer/communications device 221, the information is transmitted to the lottery central site. The instant ticket is then activated on the lottery central site database and an acknowledgement is transmitted back to the street vendor's 220 portable tablet computer/communications device 221.

A similar methodology can be employed to minimize cash outlays when the street vendor 220 is paying out prizes. In this embodiment, the street vendor 220 receives an apparent winning instant or on-line ticket from the consumer for payment. The street vendor 220 then scans the barcode of the apparent winning ticket with the portable tablet computer/communications device 221 with the decoded ticket barcode data transmitted to the lottery central site. The central site then checks its database to confirm that the ticket is in fact a winner and has not been previously paid. Assuming the ticket qualifies the central site then transmits to the street vendor 220 portable tablet computer/communications device 221 an authorization to pay data packet, which is physically printed on the street vendor's 220 portable printer 222. Once the authorization to pay is received, the street vendor 220 could pay the consumer with cash, but preferably the street vendor 220 would produce a heretofore not activated debit card and scan the card with the portable tablet computer/communications device 221 camera. Thus collecting one or more images of the debit for OCR processing of the embossed or printed card data for extraction of the card's account number. When the account number is determined (by OCR or other means), the card account data is transmitted to an issuing processor along with the authorized prize amount. The issuing processor then activates the associated debit card account funded by the winning prize amount. An acknowledgement is then transmitted back to the street vendor 220 portable tablet computer/communications device 221, which is physically printed on the street vendor's 220 portable printer 222. Of course, if the consumer already has a debit card, the above prize payment process could also be utilized to deposit the winnings directly into the consumer's card account.

As is obvious to anyone skilled in the art, the above debit card payment means could be implemented by swiping the card or manual entry and may be preferable under some circumstances. However, the OCR card-scanning embodiment is generally preferred to reduce the amount of hardware carried by the street vendor 220 as well as possibly providing a higher security means of debit or credit card scanning.

Figure 17:
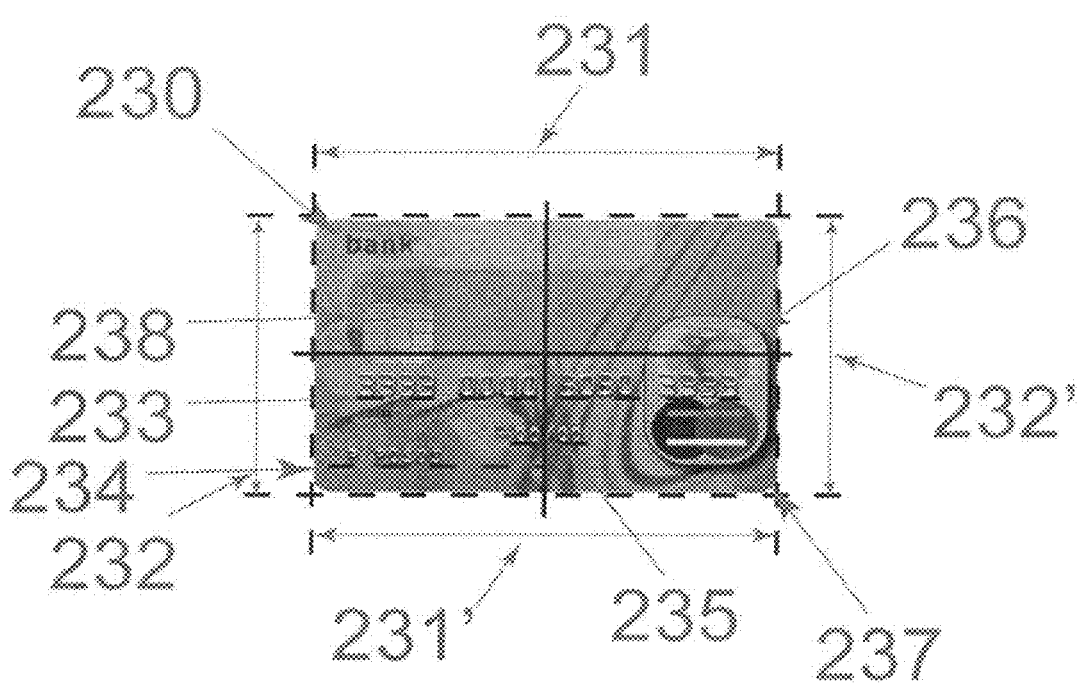
FIG. 17 is a front plan view of a first representative example of debit or credit card suitable for Optical Character Recognition (OCR)

A typical credit or debit card 230 is illustrated in FIG. 17. Since the typical credit or debit card 230 is made to specific dimensions,—i.e., ISO/IEC 7810:2003 specifying the width 231 (FIG. 17) as 85.60 mm (3.370 inches) and the height 232 as 53.98 mm (2.125 inches)—the OCR decoder software resident in the portable tablet computer/communications device 221 (FIG. 16) has the advantage of being able to automatically calibrate for the angle the debit or credit card 230 (FIG. 17) is held relative to the camera. Thus, by first programming the OCR software to detect the edges of the credit or debit card 230 then comparing the differences between the measured width 231 and height 232 ratios in pixels and the a priori pixel ratios any perceived dimensional distortions can be algorithmically eliminated. Additionally, the locations of the debit or credit card account number 233, holder's name 234, and expiration date 235 can also be deduced relative to the card image 230 edges and ratios. This greatly simplifies the task of the OCR decoder, since the algorithm will only concentrate in the areas of the card image 230 that harbor valid data. Of course, as is obvious to anyone skilled in the art, other information (e.g., Card Identification Number—CID) can also be located and decoded using this same methodology.

Figure 18:
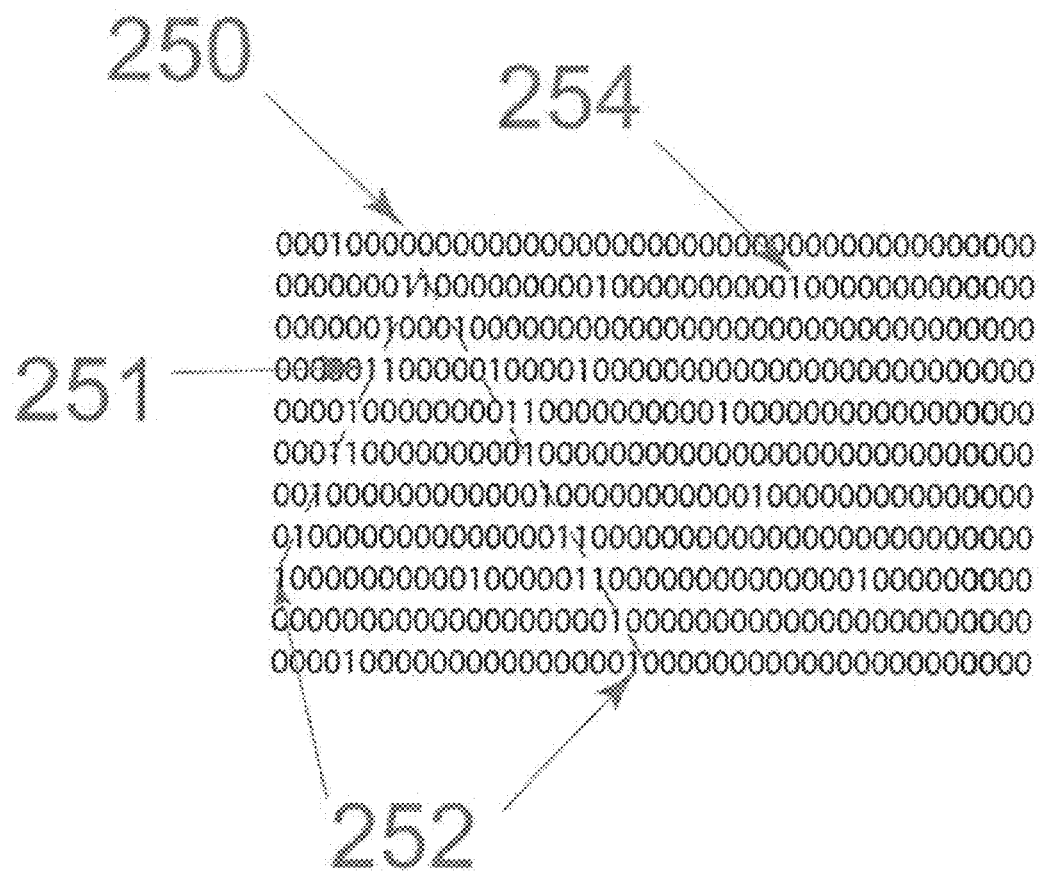
FIG. 18 is a front plan view of a first representative example of a delta memory map of the debit or credit card image of FIG. 17.

While there are numerous methods for algorithmically determining the edges of a debit or credit card 230, a preferred method is to measure the color and intensity values of each pixel relative to its neighboring pixels either horizontally or vertically checking for pixels that experience a large change or delta from a running average. When a large delta is detected, the pixel is mapped into a memory array 250 (FIG. 18) that is arranged to two dimensionally represent each pixel in the camera's field of view. After the entire image is analyzed in this fashion, the mapped memory area is reviewed by a second process that attempts to connect lines 252 connecting areas flagged as large deltas 251—the line connection process identifying possible card edges. In addition to identifying card edges, the line connection process also tends to filter out stray areas with high deltas 254 as noise since a continuous line cannot be drawn. As a secondary process, drawn lines can be tested to intersect at rounded corners, since a debit or credit card includes physically specified rounded corners 237 (FIG. 17)—i.e., 3.18 mm radius per ISO/IEC 7813. It should also be noted that the mapping and line connection process described above could be enhanced with the additional of digital filters (e.g., Kalman filter) to smooth out deltas that may be created by debit or credit card graphics.

Once the card 230 edges are known to the algorithm the differences between the measured lengths of the card 230 widths 231 and 231' and heights 232 and 232' can be compared to help determine the skew of card 230 relative to the camera. Additionally, measuring the angle of intersection of the card edges also can be utilized to help determine the skew of the image.

If multiple images of the card 230 are captured at varying angles, it is possible for the OCR application to also include a database of any security feature (e.g., hologram 236) present on card 230 with its location relative to the card image 230 edges known a priori. In this embodiment, the security feature database would be organized by debit or credit account BIN codes. The BIN being extracted from the OCR decoding of the debit or credit card account number 233 of card 230. Thus, if a familiar BIN was retrieved from the OCR decoded account number, the details of the debit or credit card layout can be retrieved from the process database. Assuming a security feature is found in the database, the OCR image processing software could also test to determine if the security feature reacts properly to a change in angle of view—e.g., hologram 236 changing color. Of course, other physical features of the debit or credit card 230 (e.g., smart card interface connector 238, embossed numbering, etc.) can be stored in the database to also ensure the card's authenticity. Conversely, if an anticipated security feature reaction was not detected or a debit or credit card 230 BIN was not found in the database, additional authentication measures may be required to ensure authenticity.

Returning to the street vendor 220 of FIG. 16. In addition to instant ticket sales and lottery redemptions, the disclosed system is also capable of selling and printing on-line (e.g., Pick 3, Pick 4, etc.) tickets. When selling on-line tickets the street vendor 220 would either type either the specific wager or quick pick request into the touch screen of the portable tablet computer/communications device 221 or possible utilize the built-in camera to scan a bet slip. In any case, the on-line sale would be paid for either by cash or (as previously discussed) via debit or possibly credit card. Once the transaction was tendered, the on-line ticket request would be transmitted to the lottery central site, the transaction logged on the central site database, with a print ticket data packet returned to portable tablet computer/communications device 221, which is then physically printed on the street vendor's 220 portable printer 222. As previously discussed, due to the invention of T-Macs (i.e., Irwin U.S. Pat. Nos. 7,788,482 and 8,037,307) there is no need for special security paper in the street vendor's 220 portable printer 222. In this embodiment, the T-Mac patents referenced cryptographic functions being performed by the portable tablet computer/communications device 221.

Thus, all of the lottery functionality can be achieved with the disclosed portable street vendor's system 220. The wireless network connectivity linking the street vendor to the lottery central site and possibly an issuing processor of a debit or credit card.

Figure 19:
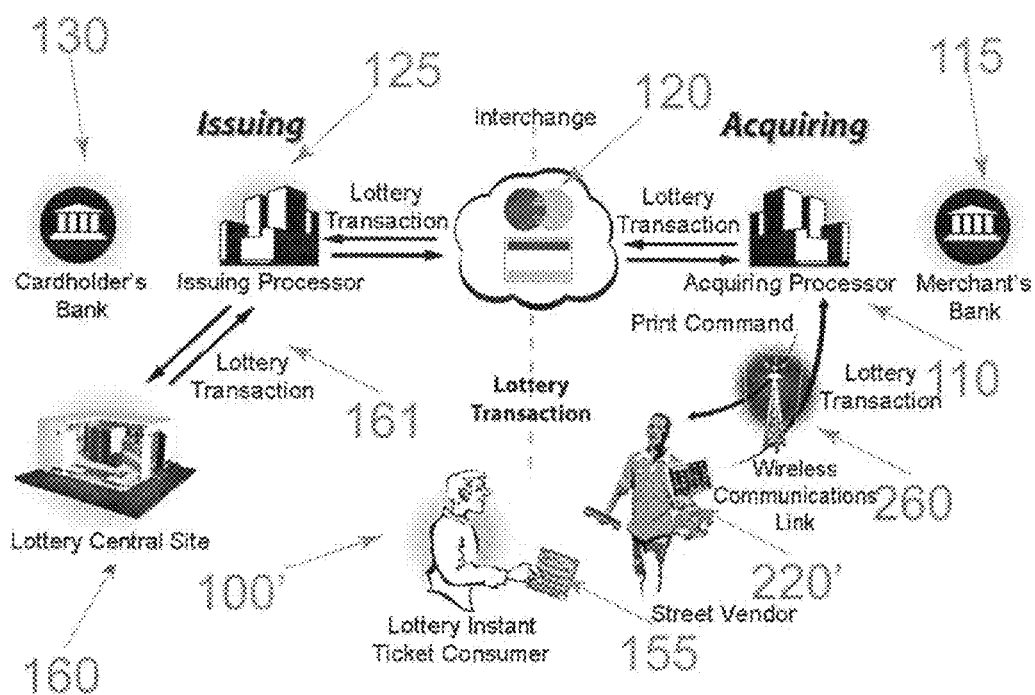
FIG. 19 is a flow chart of the representative example of the existing credit/debit card interchange network of FIG. 1 when it is utilized for portable lottery functionality.

The previously disclosed debit or credit card interchange piggybacking network is one embodiment that would accommodate the street vendor assuming a wireless cellular or other means is used to link the street vendor's 220 portable tablet computer/communications device 221 to the issuing processor and the interchange. FIG. 19 illustrates the street vendor's 220 portable system 220' communicating to the lottery central site 160 via the credit card interchange 120. In this embodiment the interchange packet transfers would occur as previously disclosed with the addition of a wireless communications system 260 completing the link between the street vendor's system 220' and the acquiring processor. However, the encapsulation of the lottery data into a data blob would be performed digitally with the BIN wrapping accomplished by the portable tablet computer/communications device 221 (FIG. 17) software.

In yet another embodiment, a comparable method can be used to sell passive game tickets by street vendors. Traditionally these tickets are printed in advance with unique identifiers—e.g., numbers. Drawings are subsequently held picking the identifiers that correspond to specific prizes. Unsold tickets for a particular drawing must be returned to the lottery in advance of the drawing requiring up to a two-day delay between the cutoff of games sales and the drawing to ensure all unsold tickets are accounted for. Often there is confusion in the return system leaving open questions as to which tickets have been sold and which are being returned. Additionally, there is also paper waste with the return of unsold tickets. The mechanism described above for the sale of on-line tickets can be adapted for passive game tickets to eliminate paper waste, returns, for drawings, and fraud while establishing a clear record of sales and 100% inventory control via the central system.

In this embodiment, the passive game tickets 224 (FIG. 19) would be printed real time with the street vendor's printer with each printed ticket including unique identifiers 227 as well as an unique serial number 225 assigned by the central site, and optionally a barcode 226. Thus, in this embodiment, there would be no preprinting of unsold tickets, with winning tickets readily redeemed via serial number lookup.

Figure 20:
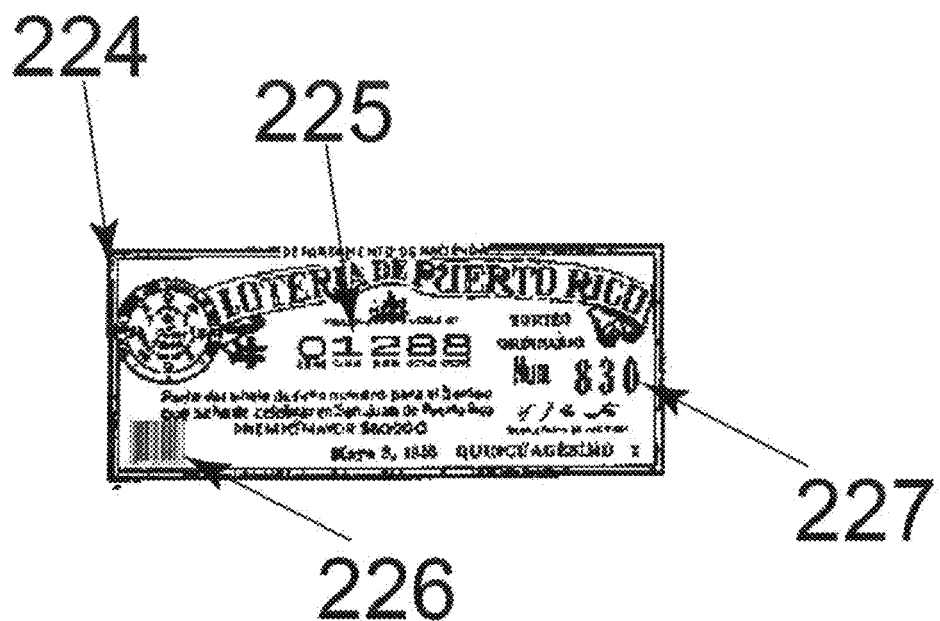
FIG. 20 is a front plan view of a first representative example of a real time printed passive ticket.

Alternatively, preprinted passive tickets 224' (FIG. 20) could still be sold through street vendors with the ticket's serial number 225' and 226' (barcoded embodiment of serial number) scanned and recorded in a central site database at the time of sale. When the passive game drawing is conducted, only preprinted tickets that were registered as sold on the central site would qualify for redemption. Therefore, in this alternative embodiment, the logistical and security problems associated with unclear record of sales and inventory control would still be eliminated, but possible problem of paper waste remains. However, if the serial numbers 225' and 226' associated with preprinted passive game tickets 224' were arranged such that any preprinted ticket would qualify for any potential drawing, with the registration of the serial number 225' and 226' tying the ticket to a particular drawing, the paper waste problem would also be eliminated. If this embodiment is employed, it may be helpful for the street vendor to print out a receipt specifying the associated preprinted passive game ticket's serial number with the drawing's date and time to eliminate confusion and/or false claims.

Figure 22:
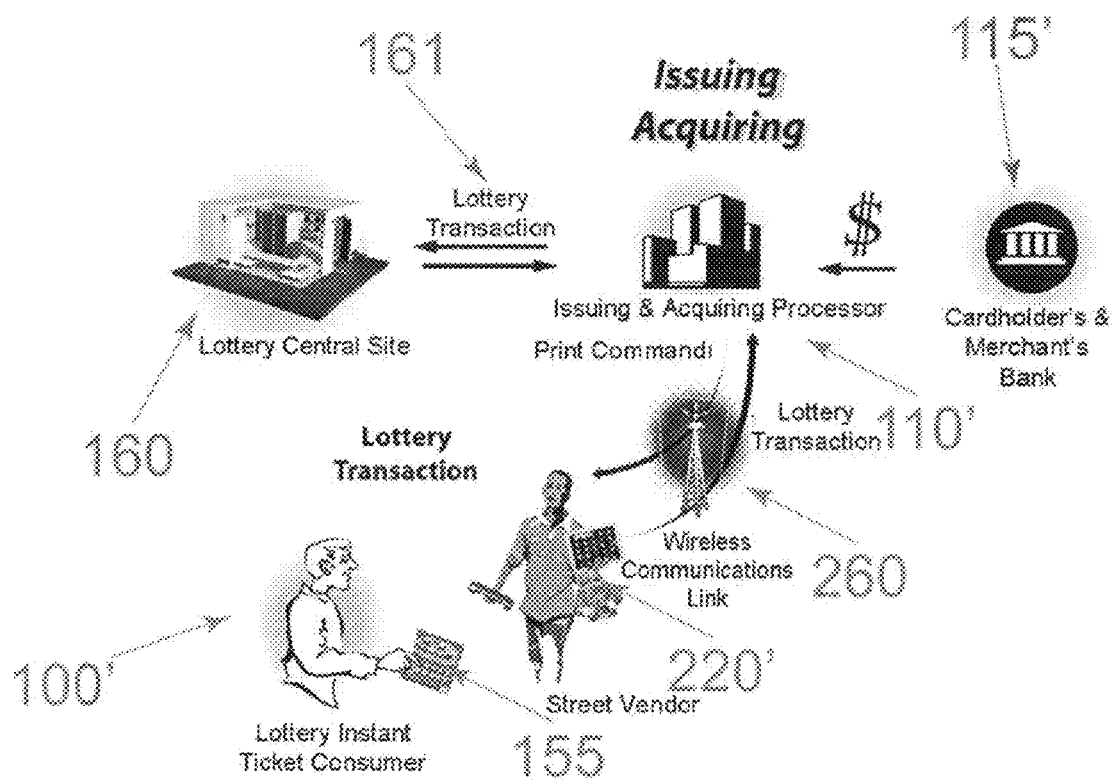
FIG. 22 is a flow chart of the representative example of the existing credit/debit card interchange network of FIG. 19 utilized for with the same acquiring and issuing processor.

Notice that the above network can be readily modified to have the advantage of the street vendor 220' using the card issuing processor as also the acquiring processor 110'—FIG. 22. As shown in FIG. 22, with this embodiment, there is no need for an interchange, since the issuing and acquiring processors 110' are the same entity. This elimination of the interchange as well as a separate acquiring processor also removes the associated interchange and acquiring processor fees, thus reducing the communication related cost of the transaction. This reduction in costing helping to fund the cost of supplying the street vendor 220' with not activated debit cards to hand out (activated) for prizes.

A typical lottery transaction with the preferred, cost reduction, embodiment of FIG. 22 would proceed similar to before. For example, an instant ticket validation scenario, the consumer 100' presents an apparent winning instant ticket 155 to the street vendor 220'. In this example, the street vendor 220' would scan the barcode that was previously hidden under the SOC of the instant ticket which is formatted to be compatible with the debit or credit interchange format—see 190 FIG. 9. The street vendor's 220' (FIG. 22) portable tablet computer/communications device 221 (FIG. 16) would then transmit the scanned barcode data through a Radio Frequency (RF) link 260 (FIG. 22) that would route the data packet to the acquiring processor 110'. However in this embodiment, the acquiring server would extract the BIN from the transmitted packet and realize the acquiring 110' and issuing processor 110' are one of the same—i.e., the BIN is identified as belonging to the issuing/acquiring processor. This BIN recognition allows the acquiring processor 110' server to route the data packet directly to the issuing processor 110' server to thereby bypassing the interchange and the associated fees. The issuing processor 110' server would then detect the lottery BIN and forward the validation data packet to the lottery central site 160 via the direct channel 161. The lottery central site would then extract the validation data from the data blob 192 (FIG. 9) to determine if the ticket is a winner and that it has not been previously cashed. Assuming the ticket is a winner and not previously cashed, the lottery central site would issue an acknowledgement payment data packet, returning the acknowledgement payment data packet back through the channel 161 (FIG. 22) to the issuing and acquiring processor 110'. The issuing and acquiring processor 110' would then relay the acknowledgement payment data packet through the wireless interface 260 back to the street vendor 220' for display and printout.

If the street vendor 220' and consumer 100' elect to complete the transaction with a debit card, the consumer 100' would either hand his authorized debit card (e.g., a debit card from a previous lottery winning, a debit card issued by the same issuing processor 110', a General Purpose Reloadable (GPR) card, etc.) to the street vendor 220' or the street vendor 220' would activate one of the un-activated debit cards he or she carries. In either case, the street vendor would then send a payment load request for the prize amount to the issuing and acquiring processor 110' via the wireless communications link 260. The issuing and acquiring processor 110' would then transfer the winning funds from the lottery's bank account to the account associated with the debit card. Once the transfer was completed and an acknowledgment received, the street vendor 220' would then hand the loaded debit card to the consumer 100'.

Figure 21:
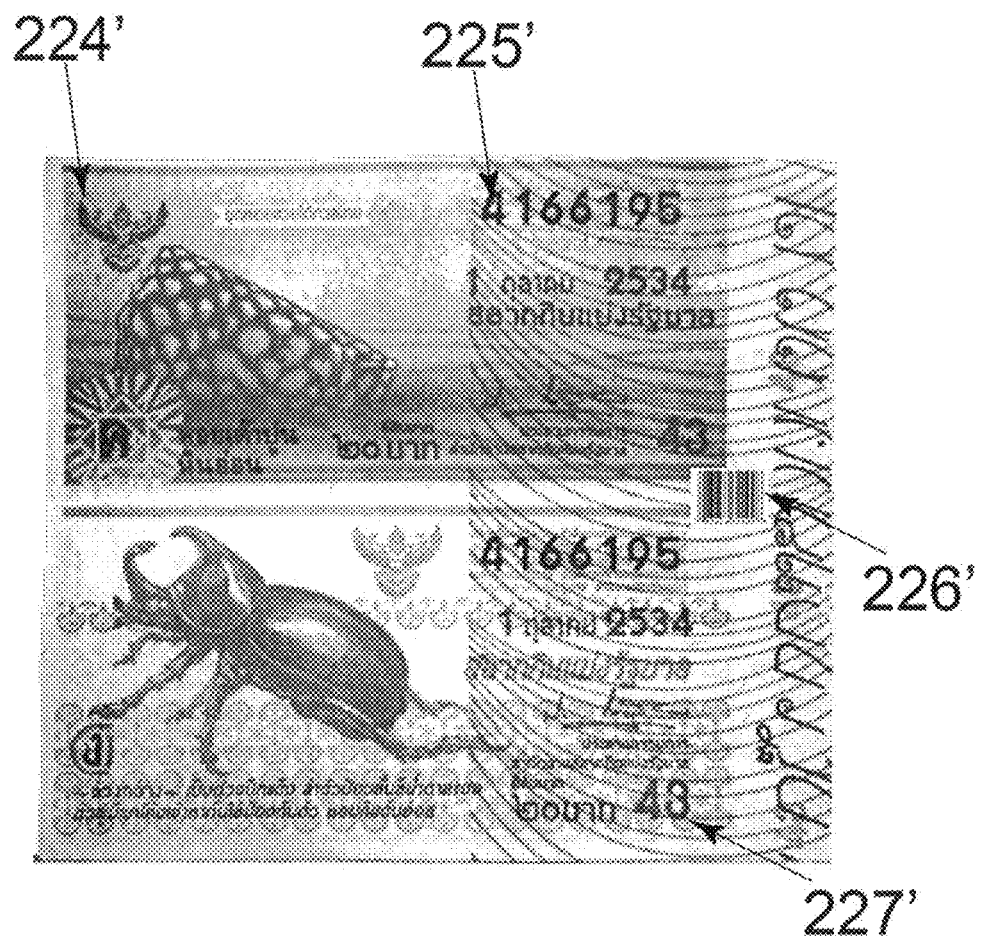
FIG. 21 is a front plan view of a first representative example of a preprinted passive ticket.
Figure 23:
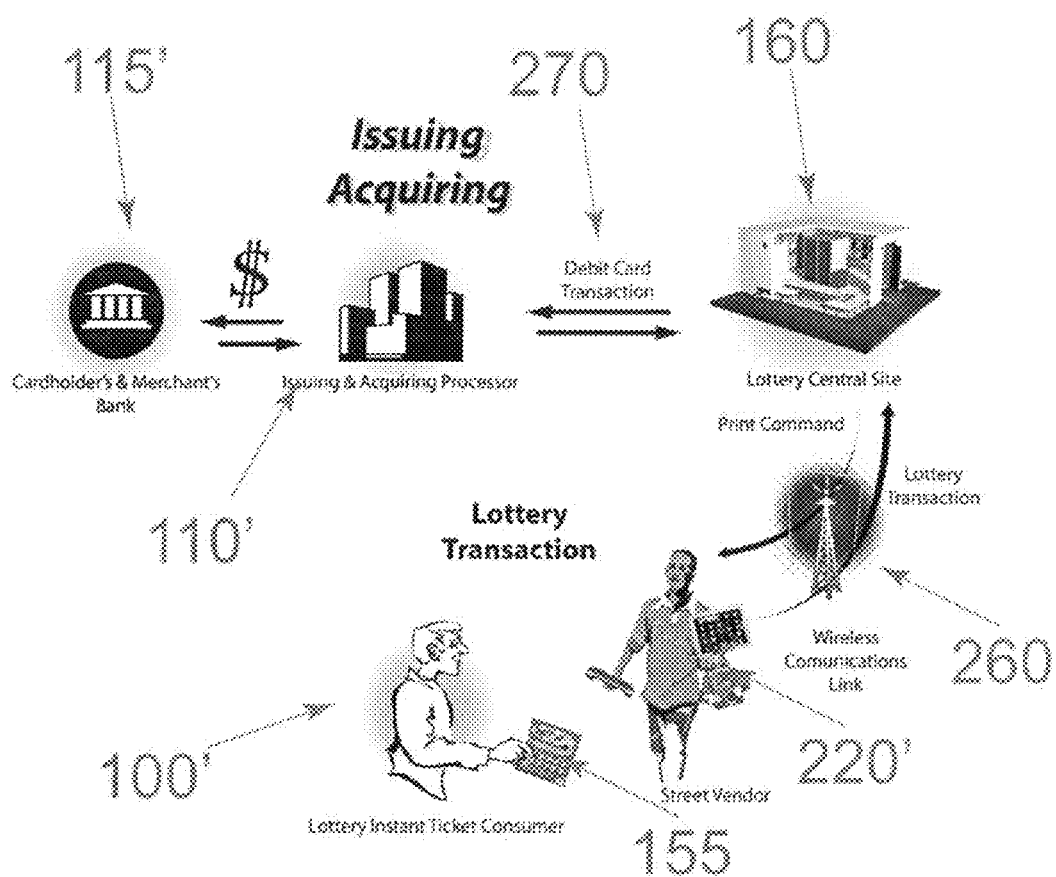
FIG. 23 is a flow chart of the representative example of portable lottery system linked directly to a central site with an additional channel to existing credit/debit card issuing and acquiring processor.

As illustrated in FIG. 21, this network can be modified in yet another embodiment to have street vendor 220' communicating wirelessly 260 directly with the lottery central site 160. As shown, with this embodiment, there is no need for interchange packet formatting, since the communication between the street vendor 220' and the lottery central site 160 is via a direct link. Thus, normal lottery transactions, including instant ticket activation are accomplished directly. However, by adding a direct connection 270 from the lottery central site 160 to the acquiring processor, all lottery transactions from all merchants can be conducted through a single interface 270 to the acquiring processor. There are several benefits to this embodiment. The first is by aggregating all debit (or possibly credit) card transactions through a single acquiring processor the volume discounts on transaction fees would most likely exceed what most merchants could achieve on their own. Another benefit is the high volume of funds flowing through the same acquiring processor may also qualify the lottery and its merchants for special discounts. Yet another benefit is, as shown in FIG. 23, aggregating all lottery transactions through a common acquiring processor 110' allows the same entity to function as issuing processor 110' for lottery BIN debit cards. As previously described, having a common acquiring and issuing processor 110' allows the debit card transaction to be conducted free of the interchange thereby avoiding interchange related transaction costs. Aside from reducing cost to the lottery and its affiliates, this type of interface could also enable micro or nano payments for other lottery transactions—e.g., Internet lottery website with a penny play on a virtual slot machine. (It should be noted that the terms "micro"- and "nano"-payments refer to small payments—typically less than $2 for micropayments and less than $1 for nano payments—for small goods and services offered over the Internet.) In other words, the existing debit/credit card interchange typically garners a processing fee close to the cost of a nano payment. However, with the aggregate acquiring processor embodiment of FIG. 23, it can become possible for the combined acquiring and issuing processor 110' to charge no fees for select transactions since its actual cost per transaction is virtually nil. The combined acquiring and issuing processor 110' making its profit from other transactions made with lottery funds.

Of course, the lottery central site connected to common acquiring processor embodiment could also be used to access the debit or credit interchange and thereby issuing processors other than the acquiring processor (not shown in FIG. 23). Also, as is obvious to anyone skilled in the art, this same direct link to the lottery central site with a direct channel to an acquiring processor can also be applied to a fixed location lottery merchant as well.

Figure 24:
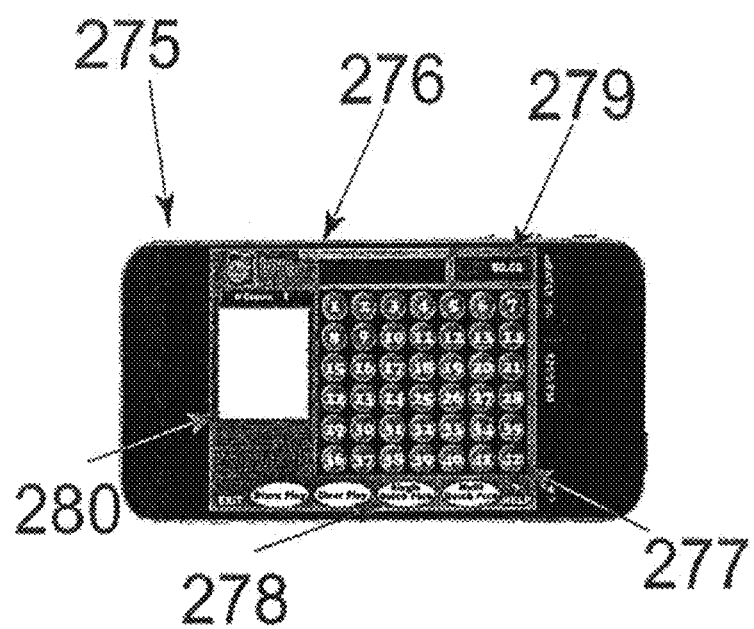
FIG. 24 is a front plan view of a first representative example of a smart telephone running a lottery application enabling the selection of online (e.g., Powerball, Pick 3, Pick 4, etc.) numbers; and, FIG. 25 is a front plan view of the first representative example of a smart telephone running a lottery application of FIG. 22 displaying a gift card activation compatible barcode to be scanned by the retailer's POS device to register an online bet over the gift card activation interchange.

Finally, consumer off-the-shelf hardware (e.g., smart telephone, tablet, etc.) can be adapted through custom applications to create a medium allowing the consumer to place specific wagers over a lottery network. In this embodiment, a lottery specific application is downloaded onto the consumer's off-the-shelf hardware to provide both a user interface as well as communications link to the lottery network. For example, FIG. 24 depicts a smart telephone 275 running a lottery specific application 276 allowing the consumer to place a Lotto type bet by either choosing specific numbers 277 or by requesting a quick pick 278 via the touch screen virtual button interface. Ideally, the lottery specific application 276 would also allow different amounts to be wagered 279 as well as multiple drawings 280.

In any case, once the wager(s) have been entered into the smart telephone 275 application 276, the smart telephone 275 must register the wager with the lottery network. There are multiplicities of methods to accomplish this registration process.

Figure 25:
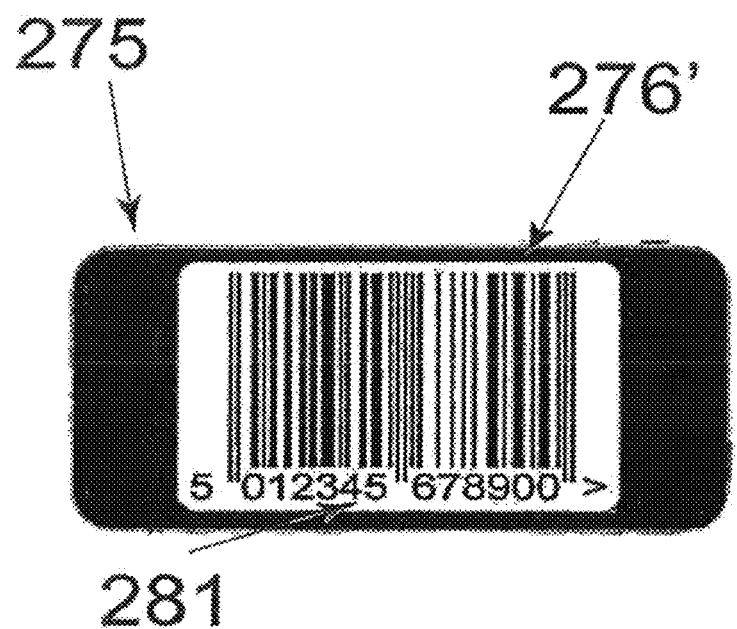

In one embodiment, a local Radio Frequency (RF) link (e.g., 802.11, Bluetooth, Near Field Communications—NFC, etc.) between the smart telephone and the lottery retailer's device (either a traditional store or a street vendor) can transfer the wager information. If a street vendor 220 (FIG. 16) is equipped with a portable tablet computer/communications device 221, the local RF link could then be relayed over the debit or credit interchange 120 (FIG. 19). In this embodiment, the smart telephone 275 (FIG. 24) application 276 or the relay process in the street vendor's portable tablet computer/communications device 221 (FIG. 16) would automatically format the wager request in a configuration that is compatible with the proxy data packet 205 (FIG. 13) normally passed over the debit or credit interchange. In other words, with the lottery BIN 206 concatenated to a data blob 207 containing the on-line wager request. Of course, the on-line wager request as with any RF link is susceptible to electronic eavesdropping and spoofing, thus any local RF system should preferably employ electronic countermeasures to protect against unscrupulous attacks. For example, the Subscriber Identity Module (SIM) present in most mobile devices is used to participate in a challenge-response dialogue authenticating the transaction to the mobile device. Alternatively, the mobile device and retailer terminal could negotiate an encryption key via a known key exchange protocol (e.g., Diffie-Hellman—*Hellman* et. al., U.S. Pat. No. 4,200,770). Finally, the street vendor 220' (FIG. 25) could also be communicating 260 directly with the lottery's central site 160. In this embodiment the formatting of the wager request would not necessarily be configured to be compatible with the debit or credit interchange format.

However, the above embodiments have the disadvantage of not being compatible with existing brick and mortar retailer POS equipment, consequently requiring custom hardware and/or software with the associated logistical challenges and costs. In a preferred embodiment, the consumer's smart telephone 275 (FIG. 25) application 276' would accomplish the lottery network wager registration process by automatically changing its display to a barcode 281 that is formatted to be compatible with the proxy data packet 205 (FIG. 13) normally passed over the debit or credit interchange. In this embodiment, two barcode displays 281 (FIG. 25) may be necessary, with the first barcode formatted to resemble the UPC that triggers a lottery transaction and the second being formatted with the lottery BIN 206 (FIG. 13) concatenated to a data blob (207) containing the on-line wager request. This embodiment having the added advantage of the data blob (207) optionally containing the data associated with a specific wager rather than a generic quick pick request.

Figure 12:
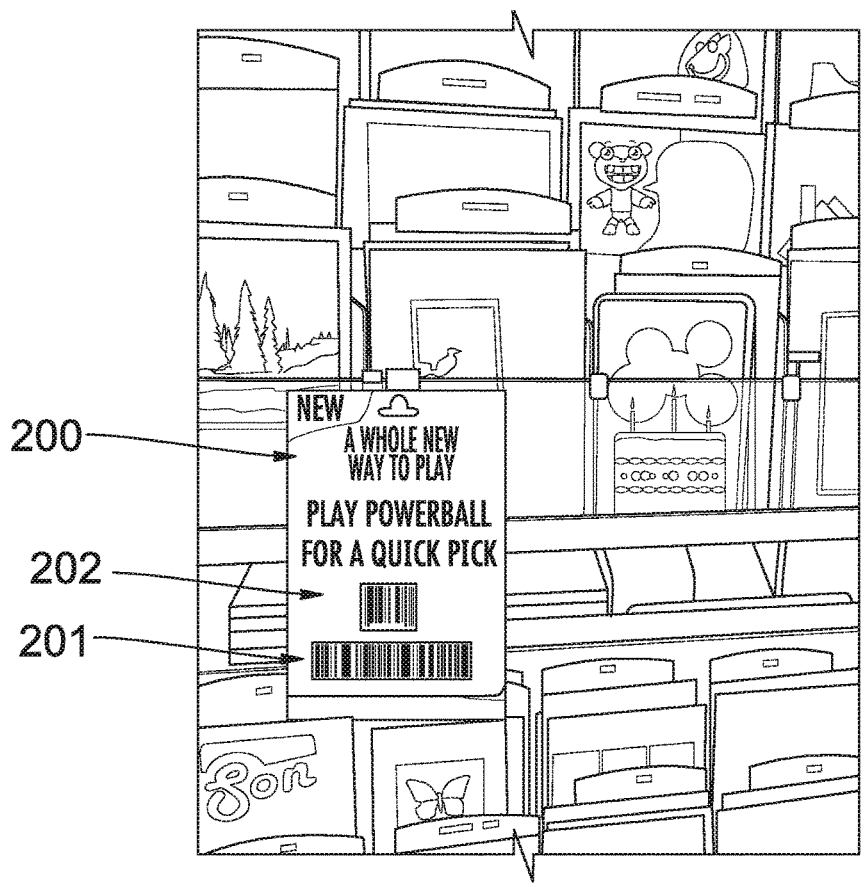
FIG. 12 is a front plan view of a first representative example of a quick-pick card compatible with the interchange network of FIG. 11.
Figure 13:
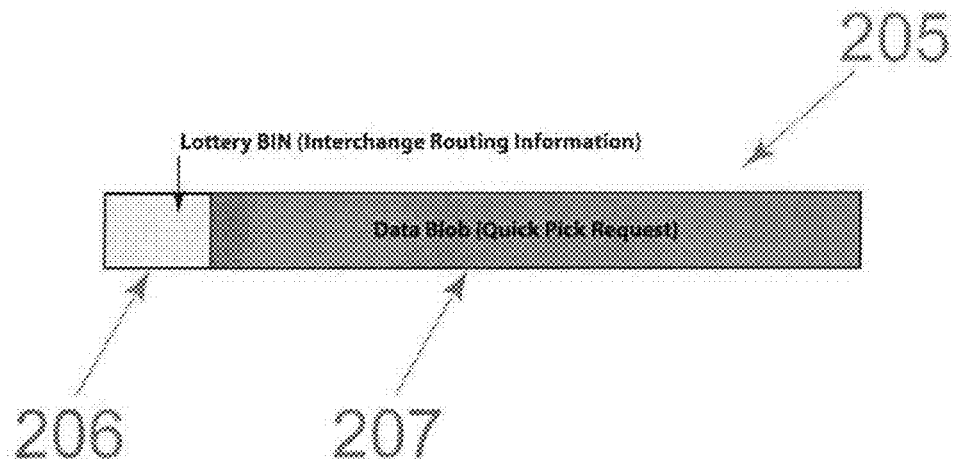
FIG. 13 is a block diagram of a first representative example of a data packet with a lottery BIN and associated instant ticket inventory request blob compatible with the interchange network of FIG. 11.

Once the smart telephone 275 (FIG. 25) barcode data 281 is scanned by the retailer's POS equipment 105 (FIG. 11), the request would be routed as previously discussed through the acquiring processor 110 and the interchange 120, to the issuing processor 125 and ultimately to the lottery's central site 160. As before, the on-line wager ticket print command would flow back through the same path printing the on-line ticket on the retailer's POS 105 printer. The only difference being that the barcode(s) 281 (FIG. 25) used to transfer the wager request over the interchange were scanned from the consumer's smart telephone 275 rather than a preprinted quick pick card 200 (FIG. 12).

Of course, as is obvious to anyone skilled in the art, other consumer devices (e.g., portable tablet computers, laptop computers, etc.) may be employed in the same embodiment and may be preferable in some cases.

What is claimed is:

1. A lottery data transfer method for processing lottery ticket data that piggybacks on a merchant's existing debit or credit card interchange system without establishing an actual debit or credit card account for a consumer, the method comprising acts of:

assigning, via a issuing processor in the merchant's credit or debit card interchange system, an identification number to lottery tickets that is unique in the merchant's credit or debit card interchange system, the identification number recognized by the issuing a processor in the interchange system as being unique to the lottery tickets and associated with a lottery data blob also provided on the lottery ticket, wherein the unique identification number does not require an actual debit or credit card account at the issuing processor;

entering, via the issuing processor, the unique identification number and lottery data blob into the merchant's existing credit or debit card activation protocol to initiate transfer of lottery data from the lottery ticket to a central lottery site via the interchange system, wherein the transferred lottery data relates to validation of lottery instant tickets, wherein the instant ticket validation is initiated by scanning a validation barcode previously hidden under a Scratch-off-Coating (SOC) on the instant ticket that. places the merchant's Point-of-Sale (POS) system in a state to process instant ticket validations using a ticket's inventory control barcode;

at the issuing processor within the interchange system, recognizing the unique identification number as a flag to initiate special routing to and further processing of the lottery data blob at the lottery central site and not as being associated with an actual debit or credit account at the issuing processor;

processing, via the issuing processor, the lottery data blob at the lottery central site outside of the interchange system's debit or credit card data transfer and processing procedures used for transactions with an actual debit or credit card account of the consumer; and issuing, via the issuing processor, a notice to the consumer that the lottery data blob has been processed.

2. The lottery data transfer method of claim 1, wherein the interchange system includes an acquiring processor and a separate issuing processor, the acquiring processor receiving and routing the identification number and lottery data blob to the issuing processor, wherein the issuing processor recognizes the unique identification number and routes the lottery data blob to the lottery central site.

3. The lottery data transfer method of claim 1, wherein the interchange system includes a common acquiring and issuing processor that receives and routes the identification number and lottery data blob to the lottery central site.

4. The lottery data transfer method of claim 1, wherein the transferred lottery data relates to sale of lottery instant tickets.

5. The lottery data transfer method of claim 4, wherein the instant ticket sales data is used for inventory control.

6. The lottery data transfer method of claim 4, wherein the instant ticket sales data is used for individual ticket activation on the lottery system.

7. The lottery data transfer method of claim 1, wherein the instant ticket validation is routed through the interchange system via the unique identification number with a flag embedded in the lottery data blob indicating that the associated data represents a lottery validation.

8. The lottery data transfer method of claim 1, wherein the instant ticket validation is routed through the interchange system via a validation lottery BIN.

9. The lottery data transfer method of claim 1, wherein the transferred lottery data relates to lottery quick-pick purchases.

10. The lottery data transfer method of claim 9, wherein the lottery quick-pick sale is initiated by scanning a card having a barcode that places the merchant's Point-of-Sale (POS) system in a state to process quick-pick lottery ticket purchases.

11. The lottery data transfer method of claim 1, wherein the transferred lottery data relates to lottery on-line game ticket validations.

12. The data transfer method of claim 1, further comprising scanning of a specially assigned barcode with the merchant's Point-of-Sale (POS) system places the POS system in a state to receive the unique identification number and lottery data blob in a format compatible with the debit or credit interchange system.

13. The lottery data transfer method of claim 12, wherein the specially assigned barcode is reserved to place the POS system in a state to receive a subsequent barcode formatted in gift debit card activation protocol without causing the POS system to register a sale.

14. The lottery data transfer method of claim 1, wherein a VPN is used to secure a network connection from the issuing processor within the interchange system to a different location.

15. The lottery data transfer method of claim 14, wherein routing information is automatically appended to the lottery data blob by an application resident on the merchant's communication device interfaced with the issuing processor within the interchange system.

* * * * *